United States Patent
Allen, Sr.

(10) Patent No.: US 11,132,885 B2
(45) Date of Patent: Sep. 28, 2021

(54) REMOTE COOKING SYSTEMS AND METHODS

(71) Applicant: Weber-Stephen Products LLC, Palatine, IL (US)

(72) Inventor: Christopher J. Allen, Sr., West Hartford, CT (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 20 days.

(21) Appl. No.: 16/738,170

(22) Filed: Jan. 9, 2020

(65) Prior Publication Data
US 2020/0143661 A1   May 7, 2020

Related U.S. Application Data

(63) Continuation of application No. 16/504,946, filed on Jul. 8, 2019, now Pat. No. 10,559,186, which is a
(Continued)

(51) Int. Cl.
*G08B 21/18* (2006.01)
*G01K 1/024* (2021.01)
(Continued)

(52) U.S. Cl.
CPC ............ *G08B 21/182* (2013.01); *A47J 36/00* (2013.01); *A47J 37/0786* (2013.01);
(Continued)

(58) Field of Classification Search
CPC .... G08B 21/182; G08B 21/185; G01K 1/024; A47J 36/321
See application file for complete search history.

(56) References Cited

U.S. PATENT DOCUMENTS

| 4,447,692 A | 5/1984 | Mierzwinski |
| 4,636,949 A | 1/1987 | Longabaugh |
(Continued)

FOREIGN PATENT DOCUMENTS

| GB | 2355805 A | 2/2001 |
| WO | 0170087 A2 | 9/2001 |

OTHER PUBLICATIONS

Brookstone, Grill Alert Talking Remote Meat Thermometer instructions, Mar. 18, 2005.
(Continued)

*Primary Examiner* — Hoi C Lau
(74) *Attorney, Agent, or Firm* — Hanley, Flight & Zimmerman, LLC

(57) ABSTRACT

A remote temperature monitoring system includes a first unit operatively connected to one or more temperature sensors for sensing the temperature of one or more materials or food items being cooked or heated. The first unit transmits the sensed temperature to a second unit that is located remotely from the first unit during heating. The second unit is programmable with the desired temperature and/or heating parameters of the item. By monitoring the temperature status of the item over time, the system determines when the food has reached the desired temperature or degree of cooking, and notifies the user.

30 Claims, 15 Drawing Sheets

Related U.S. Application Data continuation of application No. 15/704,406, filed on Sep. 14, 2017, now Pat. No. 10,388,141, which is a continuation of application No. 14/595,868, filed on Jan. 13, 2015, now Pat. No. 9,799,199, which is a continuation of application No. 12/790,764, filed on May 28, 2010, now Pat. No. 8,931,400.

(60) Provisional application No. 61/213,306, filed on May 28, 2009.

(51) Int. Cl.
| | | |
|---|---|---|
| *H04Q 9/00* | (2006.01) | |
| *A47J 36/00* | (2006.01) | |
| *A47J 37/07* | (2006.01) | |
| *G01K 1/14* | (2021.01) | |

(52) U.S. Cl.
CPC .............. *G01K 1/024* (2013.01); *H04Q 9/00* (2013.01); *G01K 1/14* (2013.01); *G01K 2207/06* (2013.01); *H04Q 2209/43* (2013.01); *H04Q 2209/823* (2013.01)

(56) References Cited

U.S. PATENT DOCUMENTS

| | | | |
|---|---|---|---|
| 4,727,799 A | 3/1988 | Ohshima et al. | |
| 4,812,963 A | 3/1989 | Albrecht et al. | |
| 5,349,162 A | 9/1994 | Holling | |
| 5,378,874 A | 1/1995 | Holling et al. | |
| 5,539,671 A | 7/1996 | Albrecht et al. | |
| 5,746,114 A | 5/1998 | Harris | |
| 6,029,141 A | 2/2000 | Bezos et al. | |
| 6,043,461 A | 3/2000 | Holling et al. | |
| 6,046,674 A | 4/2000 | Irwin | |
| 6,080,972 A | 6/2000 | May | |
| 6,539,842 B1 | 4/2003 | Chapman | |
| 6,568,848 B1 | 5/2003 | Chapman | |
| 6,615,706 B1 | 9/2003 | Wu | |
| 6,686,838 B1 | 2/2004 | Rezvani et al. | |
| 6,698,923 B2 | 3/2004 | Bedetti | |
| 6,712,505 B2 | 3/2004 | Chapman | |
| 6,811,308 B2 | 11/2004 | Chapman | |
| 6,850,861 B1 | 2/2005 | Faiola | |
| 7,075,442 B2 | 7/2006 | Lion | |
| 7,102,107 B1 | 9/2006 | Chapman | |
| 7,128,466 B2 | 10/2006 | Chang | |
| 7,201,099 B2 | 4/2007 | Harris | |
| 7,202,454 B2 | 4/2007 | Wiedemann | |
| 7,355,150 B2* | 4/2008 | Baarman .............. | H05B 6/1236 219/620 |
| 7,372,368 B2 | 5/2008 | Chapman | |
| 7,703,389 B2 | 4/2010 | McLemore | |
| 7,722,248 B1 | 5/2010 | Chapman et al. | |
| 7,733,224 B2 | 6/2010 | Tran | |
| 7,775,709 B2 | 8/2010 | Biscotti | |
| 8,384,562 B2 | 2/2013 | Wall et al. | |
| 8,398,303 B2 | 3/2013 | Kuhn | |
| 8,532,843 B2 | 9/2013 | Nagura et al. | |
| 8,920,025 B2 | 12/2014 | Andreatti | |
| 8,931,400 B1* | 1/2015 | Allen .................... | A47J 36/321 99/344 |
| 9,247,588 B2* | 1/2016 | Baarman .............. | H02J 50/10 |
| 9,799,199 B2* | 10/2017 | Allen .................... | A47J 36/321 |
| 9,841,287 B1 | 12/2017 | Hayward | |
| 9,980,321 B2* | 5/2018 | Sorenson ............. | F24C 15/105 |
| 10,025,282 B1* | 7/2018 | Wilkinson ........... | H04L 67/125 |
| 10,158,720 B2* | 12/2018 | Colston ................ | G08B 21/185 |
| 10,169,665 B1 | 1/2019 | Zhang et al. | |
| 10,213,046 B2* | 2/2019 | Nonaka ................ | A47J 36/321 |
| 10,235,884 B2 | 3/2019 | Song et al. | |
| 10,299,088 B2 | 5/2019 | Uchiyama | |
| 10,339,783 B2* | 7/2019 | Allen, Sr. ............ | A47J 36/321 |
| 10,388,141 B2* | 8/2019 | Allen, Sr. ............ | A47J 37/0786 |
| 10,395,506 B2* | 8/2019 | Allen, Sr. ............ | H04Q 9/00 |
| 10,416,311 B2 | 9/2019 | Huang et al. | |
| 10,417,714 B1 | 9/2019 | Christensen et al. | |
| 10,462,608 B1 | 10/2019 | Santarelli et al. | |
| 10,491,738 B2* | 11/2019 | Colston ............... | A47J 36/321 |
| 10,516,976 B2 | 12/2019 | Rivard et al. | |
| 10,559,186 B2* | 2/2020 | Allen, Sr. ............ | G01K 1/024 |
| 10,674,866 B2* | 6/2020 | Colston ............... | A23B 4/052 |
| 10,701,199 B2* | 6/2020 | Colston ............... | H04L 67/125 |
| 10,757,244 B2* | 8/2020 | Colston ............ | H04M 1/72415 |
| 10,785,363 B2* | 9/2020 | Colston ............... | A47J 36/321 |
| 10,789,827 B2* | 9/2020 | Allen, Sr. ............ | A47J 36/00 |
| 2002/0113057 A1 | 8/2002 | Lerner | |
| 2002/0189462 A1 | 12/2002 | Guess | |
| 2003/0202558 A1 | 10/2003 | Chung | |
| 2004/0022258 A1 | 2/2004 | Tsukada et al. | |
| 2004/0074435 A1 | 4/2004 | Kaiser et al. | |
| 2004/0115325 A1 | 6/2004 | Greiner et al. | |
| 2005/0274710 A1 | 12/2005 | Toyos et al. | |
| 2006/0027086 A1 | 2/2006 | Boyer, Jr. et al. | |
| 2006/0044935 A1* | 3/2006 | Benelli ................ | A47J 27/004 366/145 |
| 2006/0074546 A1 | 4/2006 | DeKock et al. | |
| 2006/0113295 A1 | 6/2006 | Fisher et al. | |
| 2006/0202848 A1 | 9/2006 | Volodarsky | |
| 2006/0254432 A1 | 11/2006 | McLemore | |
| 2007/0210062 A1 | 9/2007 | Gaynor et al. | |
| 2007/0221668 A1* | 9/2007 | Baarman ............. | H02J 50/80 219/746 |
| 2008/0043809 A1* | 2/2008 | Herbert ............... | G01K 1/026 374/163 |
| 2008/0141868 A1 | 6/2008 | Cook et al. | |
| 2008/0217999 A1* | 9/2008 | Baarman ............. | A47J 36/321 307/104 |
| 2009/0134151 A1 | 5/2009 | Bogatin et al. | |
| 2009/0194526 A1 | 8/2009 | Buchanan | |
| 2009/0229475 A1 | 9/2009 | Bally et al. | |
| 2010/0034935 A1 | 2/2010 | Wally et al. | |
| 2010/0132692 A1 | 6/2010 | Shaffer | |
| 2010/0301034 A1 | 12/2010 | Greenwood et al. | |
| 2010/0303972 A1 | 12/2010 | Srivastava | |
| 2013/0156902 A1 | 6/2013 | Shirali et al. | |
| 2013/0247117 A1 | 9/2013 | Kamada et al. | |
| 2013/0326137 A1 | 12/2013 | Bilange et al. | |
| 2015/0091740 A1 | 4/2015 | Bai et al. | |
| 2015/0142489 A1 | 5/2015 | Block et al. | |
| 2015/0194041 A1* | 7/2015 | Allen ................... | A47J 36/321 340/584 |
| 2015/0196161 A1 | 7/2015 | Myllymaki | |
| 2016/0153789 A1 | 6/2016 | Gallar et al. | |
| 2016/0229435 A1 | 8/2016 | Ryan | |
| 2016/0253049 A1 | 9/2016 | Wild et al. | |
| 2016/0335874 A1* | 11/2016 | Allen, Sr. ............ | A47J 36/00 |
| 2017/0006449 A1 | 1/2017 | Igumnov et al. | |
| 2017/0113512 A1 | 4/2017 | Park et al. | |
| 2017/0243485 A1 | 8/2017 | Rubin et al. | |
| 2017/0288722 A1 | 10/2017 | Berry | |
| 2017/0311228 A1 | 10/2017 | Zavesky et al. | |
| 2018/0005508 A1* | 1/2018 | Allen, Sr. .......... | A47J 37/0786 |
| 2018/0005509 A1* | 1/2018 | Allen, Sr. ............ | G01K 1/024 |
| 2018/0082134 A1 | 3/2018 | Sivaraman | |
| 2018/0097923 A1 | 4/2018 | Pandurangarao | |
| 2018/0097928 A1 | 4/2018 | Pandurangarao | |
| 2018/0283895 A1 | 10/2018 | Aikin | |
| 2018/0297210 A1 | 10/2018 | Peterson et al. | |
| 2018/0324908 A1* | 11/2018 | Denker ................ | G06T 7/0002 |
| 2018/0342157 A1 | 11/2018 | Donnelly et al. | |
| 2019/0045417 A1 | 2/2019 | Logan et al. | |
| 2019/0053332 A1* | 2/2019 | Cheng .................. | H05B 6/668 |
| 2019/0132703 A1 | 5/2019 | Ramasamy | |
| 2019/0266876 A1* | 8/2019 | Allen, Sr. ............ | G08B 21/182 |
| 2019/0285483 A1* | 9/2019 | Cheng .................. | G01K 1/026 |
| 2019/0301891 A1 | 10/2019 | Rowitch | |
| 2019/0333360 A1* | 10/2019 | Allen, Sr. ............ | A47J 36/321 |
| 2019/0385432 A1* | 12/2019 | Allen, Sr. ............ | G01K 1/024 |

(56) References Cited

U.S. PATENT DOCUMENTS

2020/0143661 A1* 5/2020 Allen, Sr. .............. G01K 1/024
2020/0357260 A1* 11/2020 Allen, Sr. ........... A47J 37/0786

OTHER PUBLICATIONS

Weber Style Digital Thermometer (available prior to May 28, 2009).
United States Patent and Trademark Office, "Non-Final Office Action," issued in connection with U.S. Appl. No. 14/595,868, dated Nov. 10, 2016, 8 pages.
United States Patent and Trademark Office, "Final Office Action," issued in connection with U.S. Appl. No. 14/595,868, dated Mar. 30, 2017, 5 pages.
United States Patent and Trademark Office, "Notice of Allowance and Fee(s) Due," issued in connection with U.S. Appl. No. 14/595,868, dated Jul. 25, 2017, 5 pages.
United States Patent and Trademark Office, "Non-Final Office Action," issued in connection with U.S. Appl. No. 15/218,330, dated Jun. 6, 2018, 8 pages.
United States Patent and Trademark Office, "Final Office Action," issued in connection with U.S. Appl. No. 15/218,330, dated Oct. 16, 2018, 7 pages.
United States Patent and Trademark Office, "Notice of Allowance and Fee(s) Due," issued in connection with U.S. Appl. No. 15/218,330, dated Feb. 14, 2019, 9 pages.
United States Patent and Trademark Office, "Requirement for Restriction," issued in connection with U.S. Appl. No. 15/704,406, dated Sep. 5, 2018, 6 pages.
United States Patent and Trademark Office, "Notice of Allowance and Fee(s) due," issued in connection with U.S. Appl. No. 15/704,406, dated Apr. 8, 2019, 14 pages.
United States Patent and Trademark Office, "Notice of Allowance and Fee(s) Due," issued in connection with U.S. Appl. No. 16/504,946, dated Oct. 3, 2019, 9 pages.
United States Patent and Trademark Office, "Non-Final Office Action," issued in connection with U.S. Appl. No. 15/704,382, dated Jul. 13, 2018, 17 pages.
United States Patent and Trademark Office, "Final Office Action," issued in connection with U.S. Appl. No. 15/704,382, dated Dec. 17, 2018, 20 pages.
United States Patent and Trademark Office, "Notice of Allowance and Fee(s) Due," issued in connection with U.S. Appl. No. 15/704,382, dated Apr. 12, 2019, 10 pages.
United States Patent and Trademark Office, "Non-Final Office Action," issued in connection with U.S. Appl. No. 16/509,800, dated Oct. 3, 2019, 6 pages.
United States Patent and Trademark Office, "Final Office Action," issued in connection with U.S. Appl. No. 16/509,800, dated Jan. 13, 2020, 15 pages.
United States Patent and Trademark Office, "Notice of Allowance and Fee(s) Due," issued in connection with U.S. Appl. No. 16/509,800, dated May 5, 2020, 10 pages.

* cited by examiner

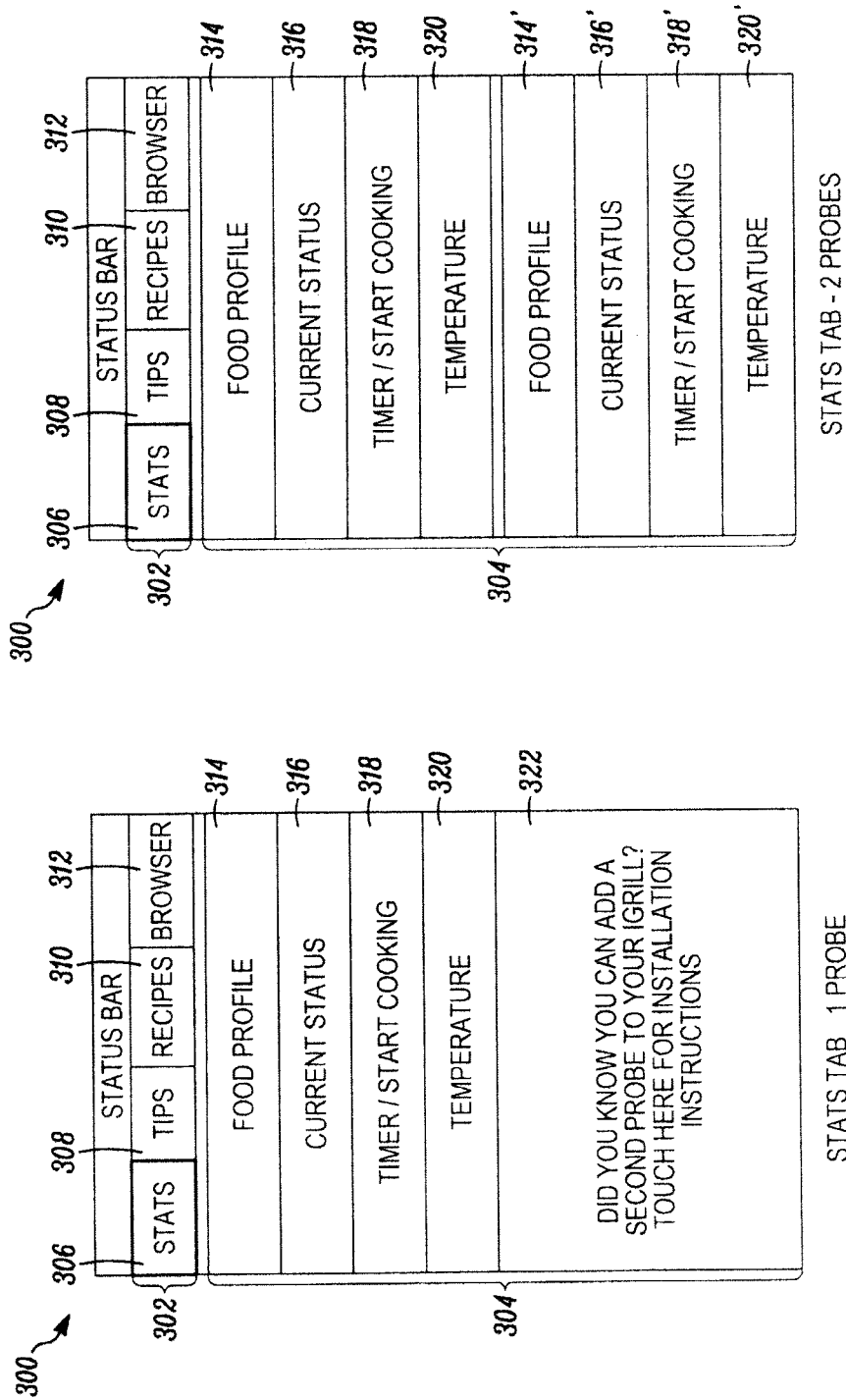

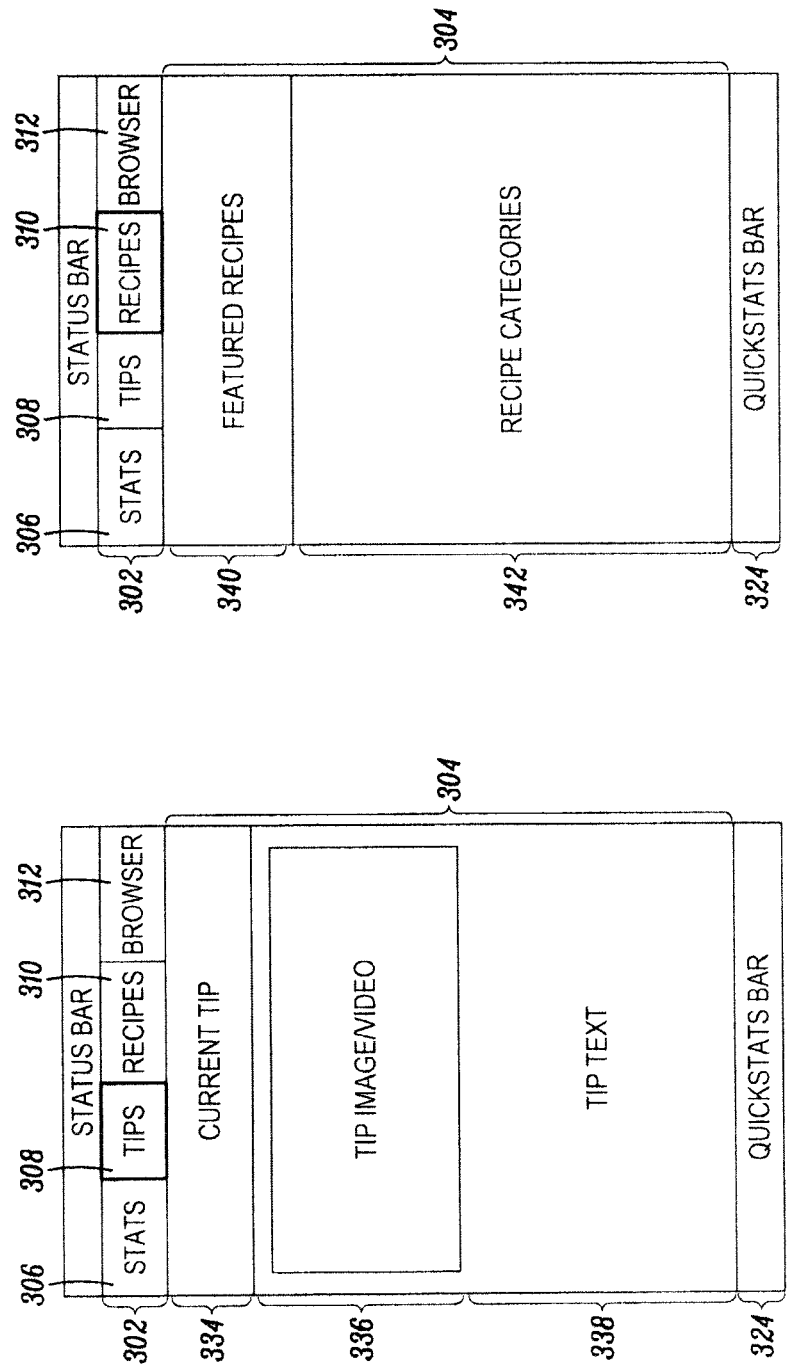

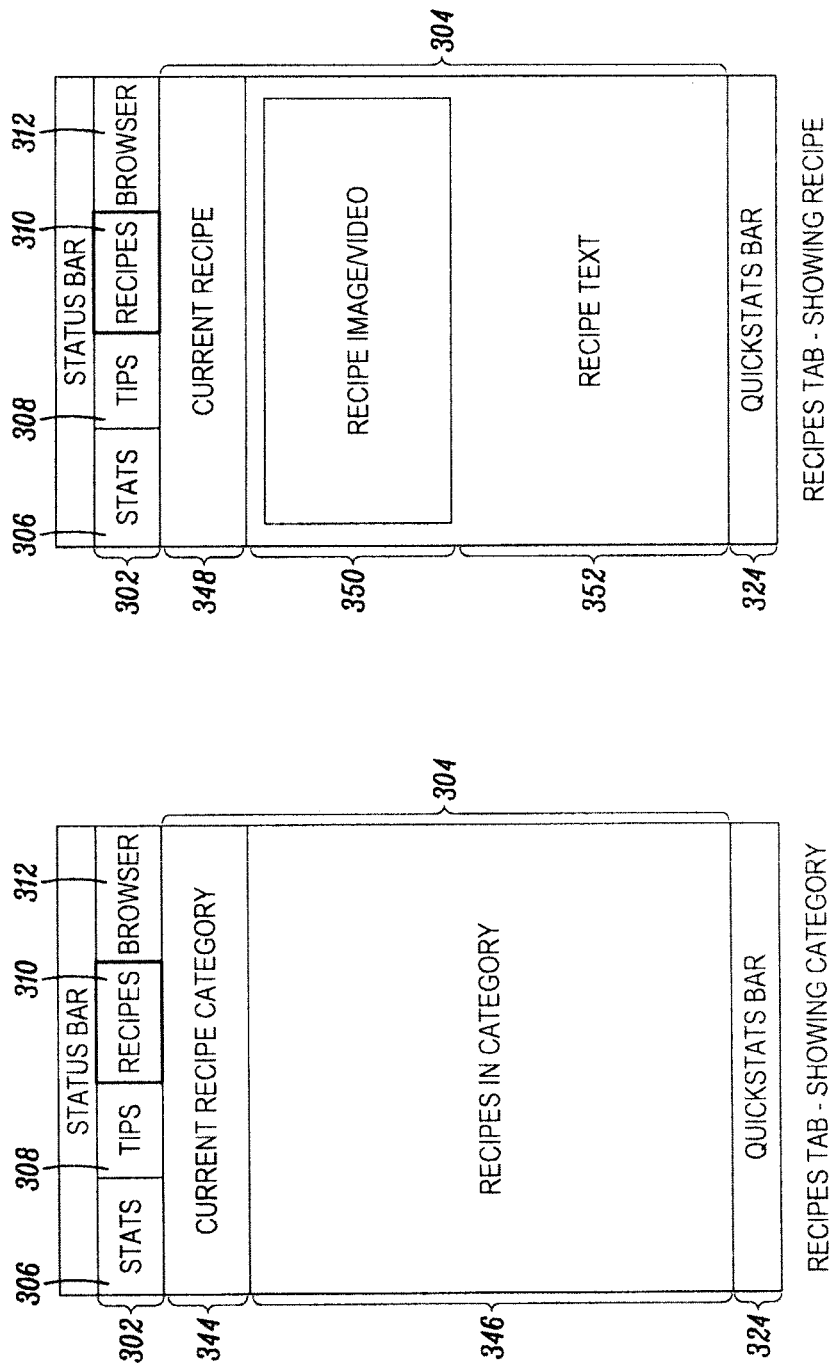

REMOTE COOKING SYSTEMS AND METHODS

CROSS-REFERENCE TO RELATED APPLICATIONS

This patent application is a continuation of U.S. patent application Ser. No. 16/504,946, filed on Jul. 8, 2019, now allowed, which is a continuation of U.S. patent application Ser. No. 15/704,406, filed on Sep. 14, 2017, issued as U.S. Pat. No. 10,388,141 on Aug. 20, 2019, which is a continuation of U.S. patent application Ser. No. 14/595,868, filed on Jan. 13, 2015, issued as U.S. Pat. No. 9,799,199 on Oct. 24, 2017, which is a continuation of U.S. patent application Ser. No. 12/790,764, filed on May 28, 2010, issued as U.S. Pat. No. 8,931,400 on Jan. 13, 2015, which in turn claims the benefit under 35 U.S.C. § 119(e) of U.S. Provisional Patent Application No. 61/213,306, filed on May 28, 2009. All of these disclosures are hereby expressly incorporated by reference as part of the present disclosure as if fully set forth herein.

FIELD OF THE INVENTION

The present invention relates to temperature monitoring systems and methods, such as for food preparation.

BACKGROUND INFORMATION

In many heating processes such as food preparation and cooking, the temperature of the item or material being heated is of critical importance in obtaining a suitable or desired result. In cooking, for example, the temperature of the food plays a role, often determinative, in the degree to which the food is cooked. The temperature itself may be indicative as to degree to which the food is cooked. The degree to which the food is cooked is not only relevant to the taste of the food, as may be desired by the person consuming food, but also highly relevant to the safety of the food. To this end, for example, the U.S. Department of Agriculture (USDA) has issued guidelines establishing food temperatures at which it considers the food, e.g., beef, poultry, pork, etc. to be adequately cooked to sufficiently destroy microbial or other biological contaminants in the food so as to be generally safe to eat. In addition, the temperatures necessary to provide a desired degree of cooking or taste (e.g., rare, medium, well-done) are generally known.

For this purpose, food thermometers may be used to measure the temperature of the food. A drawback of standard food thermometers is that one is required to be physically present at the location the food is being cooked in order to view the temperature of the food displayed by the thermometer. This inconveniently prevents the user from attending to other activities and/or requires the user to return to the cooking location to monitor the progress of the cooking. If the user does not return in time, the food may be overcooked.

Devices that remotely monitor the temperature of the food being cooked are known. However, known devices have several drawbacks. First, such devices require specialized equipment including a first unit located at the location the food is being cooked, and a second unit located remotely from the food cooking location. The use of two specialized units incurs increased costs. Further, known devices have limited flexibility in use and limited programmability.

SUMMARY OF THE INVENTION

The present invention provides temperature monitoring systems and methods whereby the temperature status of an item or items may be monitored and/or controlled from a location that is different from the location at which the item is located. In various embodiments, the temperature status may monitored and/or controlled via communication between a first unit located at or near the location at which the item is located, and a second unit located at a different location. The first unit may include or be operatively connected to one or more temperature sensors by which the temperature(s) of the item(s) is determined. Temperature information is then transmitted to the second unit, which is relayed to a user by visual or other indication.

The heating parameters of the item may be entered, programmed or selected by a user using the second unit. The second unit may then determine various heating characteristics of the item, such as, by way of example only, heating time. The second unit may utilize the temperature received from the first unit to update the status and heating characteristics on a real-time or near real-time basis. In additional embodiments, heating parameters may be set, modified or altered by a user utilizing the first unit, which communicates this information to the second unit. The second unit then may adjust or update its programming and its determination of the heating characteristics and status of the item.

In various embodiments, the second unit is a computer or computerized electronic device that is not specific to heating applications or the first unit, but has the necessary existing hardware, firmware and/or software capabilities so that a heating application, e.g., a program or computer application, may be installed and executed, on a temporary or permanent basis, and to communicate with the first unit. Examples of such devices include, but are not limited to, smartphones (BLACKBERRY, IPHONE, etc.), computers (desktop, laptop, etc.), handheld computing devices, and other portable computerized devices (PDA, IPAD, IPOD, etc.). In these embodiments, only the first unit and temperature sensors need be provided and/or purchased by the user, and a software application installed on the user's existing (or otherwise acquired) second unit. Thus, the cost of a second unit, from both the manufacturing and purchasing perspective, is avoided.

Such second units also provide flexibility in the software application because it can take advantage of the existing capabilities of the second unit. Such capabilities may include, by way of example only, storing and/or downloading (e.g., Internet) information such as multimedia for presentation or playback to the user, and the ability to easily alter or update the software application itself and the information stored in the second unit utilized by the application. Further, where the second unit is portable, the user may move to other locations and/or attend to other activities and remain updated as to the status of the item. To where the user may move and remain updated from the first unit is limited only by the built-in communication capabilities of the second unit. In embodiments where the second unit has multiple communication modes, e.g., wireless, Bluetooth, internet, etc., these may be utilized and/or selected as needed or desired so that the second unit may receive the temperature information from the first unit.

Certain embodiments of the invention may be used for food preparation, such as for cooking or heating food. In such embodiments, the status of a food being cooked is monitored and/or controlled from a location that is different from the location at which the food is being cooked. More specifically, the status of the food is monitored and/or controlled via communication between a first unit located at or near the location at which the food is being cooked, and a second unit located at a different location. In such embodiments, the user may select the cooking parameters for the food using the second unit, which then determines the cooking characteristics of the food. The user may then attend to other activities while the food is cooking, and may monitor the temperature and/or status of the food on the second unit. Yet further, the second unit may notify the user when the food is done so that the user can locate to the cooking equipment and turn it off or otherwise remove the food from the cooking device. In yet additional embodiments, if the user wishes to cook the food more, the user can update one or more cooking parameters on the first unit, which transmits those updated parameters to the second unit, which updates the cooking characteristics. The user can then proceed to another location and be re-notified when the food is done cooking in accordance with the newly entered parameters.

Other objects and advantages of the present invention will become apparent in view of the following detailed description of the embodiments and the accompanying drawings.

BRIEF DESCRIPTION OF THE DRAWINGS

FIG. 8A is schematic of a first mode of the user interface of an embodiment of a control unit in accordance with the present disclosure.

FIG. 8B is schematic of a second mode of the user interface of the control unit of FIG. 1.

FIG. 9D is schematic of a seventh mode of the user interface of the control unit of FIG. 1.

FIG. 10A is schematic of a eighth mode of the user interface of the control unit of FIG. 1.

FIG. 10B is schematic of a ninth mode of the user interface of the control unit of FIG. 1.

FIG. 10C is schematic of a tenth mode of the user interface of the control unit of FIG. 1.

DETAILED DESCRIPTION OF EMBODIMENTS OF THE INVENTION

Figure 1:
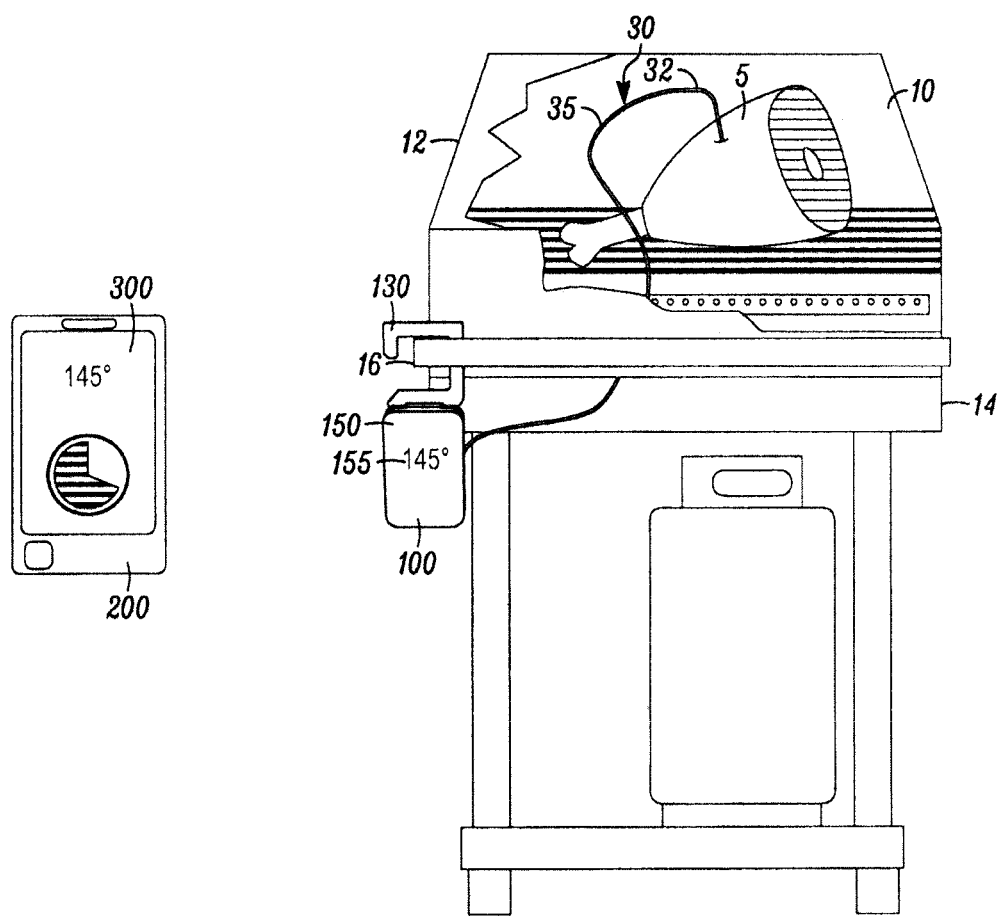
FIG. 1 is a schematic view of an embodiment of a cooking system in use in accordance with present disclosure.

In FIG. 1, a food item 5 is being cooked or heated by a cooking device 10. The term "food item" is intended to encompass any item that may be ingested, including, without limitation, for example, food and drink and other ingestible items, such as, for example, medicines, and is not limited to any particular items. In FIG. 1, the cooking device 10 is shown as a gas or propane grill. However, it is contemplated that the cooking device 10 may be any mechanism by which food may be heated or cooked, including, without limitation, for example, a barbeque, an open fire (e.g., a campfire), an oven (indoor or outdoor), a microwave, an infrared heating device, or other types of cooking or heating mechanisms. Further, it is not intended that the manner in which the food item is cooked or heated is limited in any manner. For example, in addition to grilling, it is anticipated that the food may be roasted, baked, broiled, boiled, steamed, barbequed, smoked, poached, cooked, or heated in any other manner that is known or may become known.

A temperature sensor 30 is used to determine the temperature of the food item 5. The temperature sensor 30 may be a temperature probe, such as those that are currently known and available. Such probes are available from multiple sources, such as Cooper-Atkins Corporation of Middlefield, Conn. The probe may be a thermistor-type temperature sensor, a thermocouple-type sensor, or another type of sensor as may be known or become known.

The sensor 30 has a sensing portion 32 at a distal end that contacts or is inserted into the food 5 and senses the temperature, and a cable 35 that provides the information or signal from the sensor 30. A sensor connector 38 is located at a proximal end of the sensor 30 for connecting the sensor 30 to another component and transmit the temperature information or signal to that component. The cable 35 and connector 38 may also be used to supply electrical current to the sensing portion 38. For example, in a thermistor-type sensor, an electrical current usually a small current, is supplied to the probe 30.

In FIG. 1, the sensing portion 32 and/or cable 35 are of sufficient length so as to extend from the food cooking inside the grill 10 to the exterior of the grill 10. Specifically how the sensor 30 extends from the interior to the exterior depends to some extent on the configuration of the cooking device. In FIG. 1, the cable 35 extends between the grill cover 10 and the grill base 14. However, depending on the cooking device 10, the sensing portion 32 and/or cable 35 may extend through an opening in the cooking device 10 or by other means. The sensing portion 32 and/or the cable 35 may be flexible or bendable so that it can be configured as desired to be located at the appropriate location for sensing the food temperature and extend to the exterior of the cooking device 10.

The sensor 30 is constructed so that it may sense the temperature of the food 5 at a desired location. For example, it may be desired to sense the temperature of an internal portion of the food. In such embodiments, the sensing portion 32 is constructed so that it may be inserted into the food an appropriate distance to measure the temperature at the desired location. For example, the sensing portion 32 may contain a piercing portion 40 configured to pierce the food via a cutting or piercing shape, e.g., a needle shape. The temperature may be sensed at the location of the piercing portion 40. In further embodiments, the sensing portion 32 contains one or more indicia 42 indicating the depth that the sensing portion 32 is inserted. These depth indicators 42 can assist a user in positioning the sensing portion 32 at the desired depth or location.

In the embodiment of FIG. 1, the sensor 30 is formed of materials that can withstand the environment in which they operate. For example, in a grill environment, the materials can withstand the heat of a propane grill, which can reach 700° F. or more. The sensor 30 may also be exposed to food products (e.g., grease) and environmental elements, e.g., rain, dust, etc. For example, the sensing portion 32, or at least a portion thereof, may be made of steel (e.g., stainless steel) or another metal or high temperature material, and may be compatible with food so as not to contaminate or otherwise affect the food 5. The cable 35 may be covered or reinforced with heat and environment resistant materials, e.g., Kevlar® or metal braiding. Those skilled in the art will understand what materials to use for the intended environment and how to make the sensor 30 sufficiently durable.

It should be understood that while FIG. 1 shows a temperature probe, any suitable temperature-sensing device may be utilized. For example, an infrared temperature-sensing device could be used. It may be desirable, for example, to measure a surface temperature of the food rather than the temperature of a specific point or an internal portion of the food. Further, though a cable is shown for transmitting the temperature information, other modes of transmission may be used, e.g., wireless or infrared transmission.

As shown in FIG. 1, a first unit or remote unit 100 receives the temperature information or signal from the sensor 30 and determines, utilizing that information or signal, the sensed temperature of the food 5. The remote unit 100 then communicates that temperature to a second unit or control unit 200, whose structure and function is described in further detail below. In FIG. 1, the remote unit 100 is located in general proximity to the food 5 being cooked and/or the cooking device 10 so that it may be connected to the cable 35.

As shown in FIGS. 3 and 5-7, the remote unit 100 has a receptacle 120 that receives the connector 38 of the temperature sensor 30. The receptacle 120 conducts or otherwise relays the information or signal from the temperature sensor to the remote unit 100 for temperature determination. In the embodiment shown, the connector 38 and receptacle 120 are a headphone jack type connection. Such a removable or detachable connection permits the user to remove and replace the sensor 30, such as when, e.g., the sensor 30 breaks or another type of sensor 30 is desired to be used. As will be appreciated by those of ordinary skill in the art, though, the connector 38 and receptacle 120 may take any form of connection between the temperature sensor 30 and the remote unit 100. In embodiments where there is a wireless connection between the two, the connector 38 and receptacle 120 may be a wireless transmitter/receiver, such as, for example, an infrared transmitter and receiver. In yet further embodiments, there may be a direct or hard-wire connection between the sensor 30 and the remote unit 100.

In other embodiments, the remote unit 100 may have more than one receptacle 120 or sensor connection so that more than one sensor 30 may be used at one time. Alternatively, two sensors may connected to the remote unit using one cable 35 and receptacle. In such embodiments, the remote unit 100 determines the sensed temperature of each sensor 30 and communicates those temperatures to the control unit 200. For example, two sensors 30 may be used to sense the temperatures of separate food items 5 being cooked, which may require different cooking temperatures from each other. Accordingly, the food items may be cooked in separate cooking devices 10. Alternatively, multiple sensors 30 may be placed in different parts of a single food item to monitor the temperature in more than one location. The use of multiple temperatures may assist in the determination of whether the food item as whole is cooked or heated as desired.

The remote unit 100 determines the temperature sensed by the sensor 30 by any suitable techniques that are currently known of may become known. For example, when using a thermistor-type sensor 30, the temperature is determined by correlating the electrical resistance or change in resistance of the material in the sensor that changes with temperature (e.g., by measuring voltage or current passing though the sensor 30) to a temperature of the material. In a thermocouple-type sensor, the temperature is determined by correlating the voltage or change in voltage across the sensor 30, which changes with temperature, to the temperature of the sensor 30. Those of ordinary skill in the art should understand how to determine the temperature of the food item using temperature sensors as contemplated by the invention.

The remote unit 100 comprises a case 110 that encloses the internal components of the remote unit. The case 110 may be of any suitable material and construction, as will be appreciated by those in the art. The case 110 may be constructed to provide relative durability of the remote unit 100 in the operating environment. For example, in case of use of the remote device 100 with a grill 10 as depicted in FIG. 1, the case 110 may be constructed to resist the heat encountered due to proximity to the grill, e.g., 130° F. or more. The case may also be constructed to resist environmental exposure such as water (e.g., rain), dust, etc. and food exposure (e.g., grease). The case 110 may also be constructed to resist impact or drops. Many known materials are suitable for this purpose, such as, for example, impact resistant or hardened plastics, metals, polycarbonates, composite materials such as carbon-fiber materials, etc. Those of skill in the art will understand how to construct the remote unit 100 for suitable durability in the operating environment.

Figure 5:
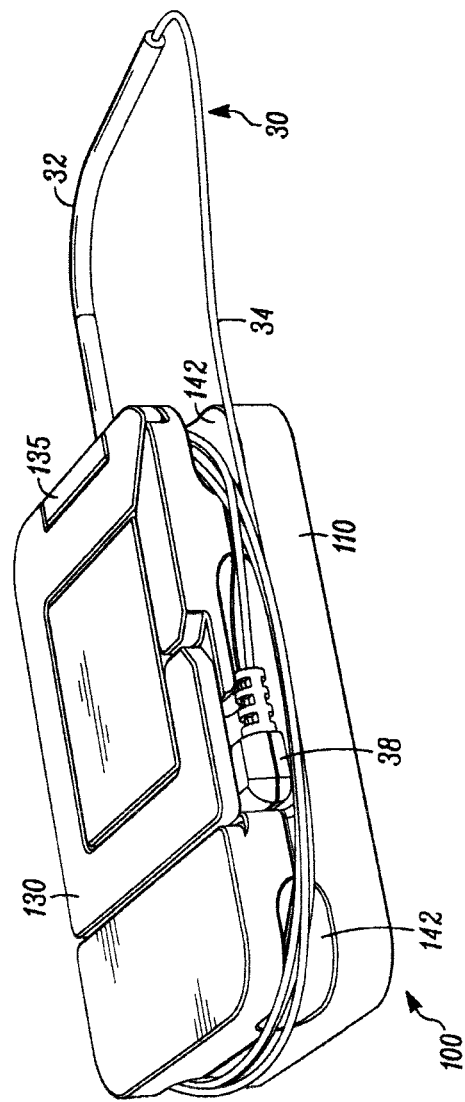
FIG. 5 is a rear perspective view of the remote unit of FIG. 1.
Figure 6:
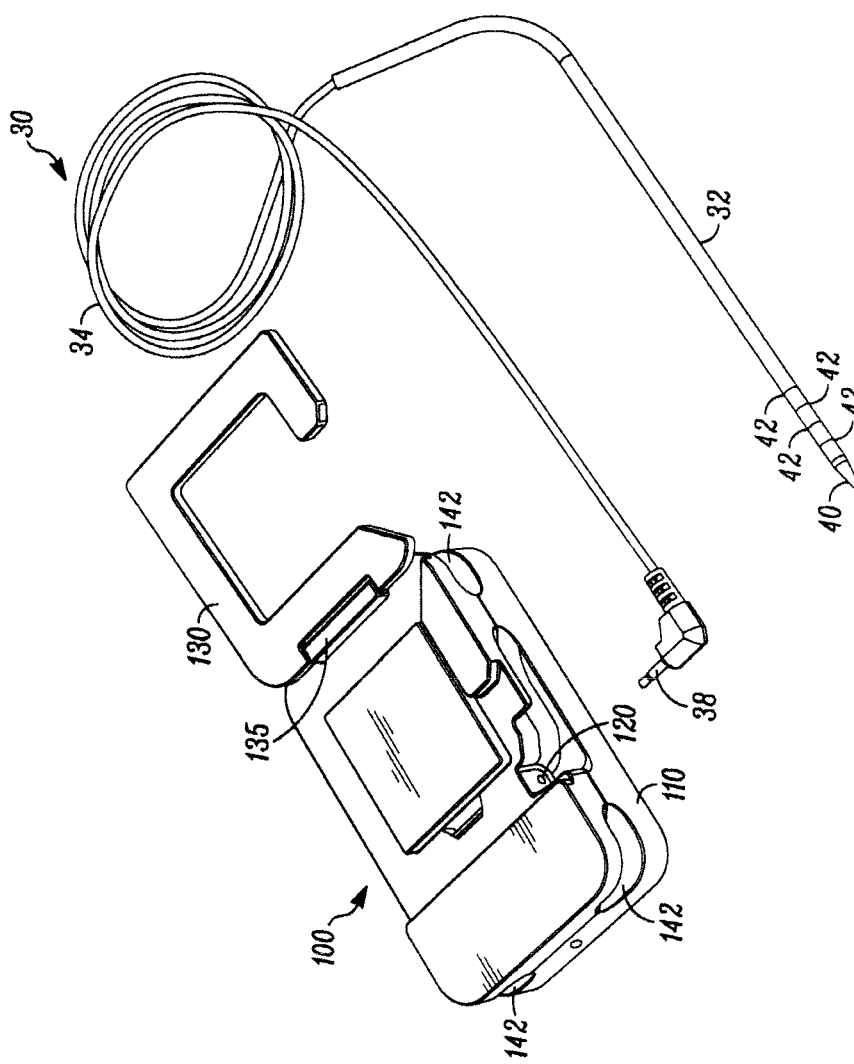
FIG. 6 is a rear perspective view of the remote unit of FIG. 1 with the unit handle in an extended position.

The remote unit 100 may include a handle 130 to facilitate carrying, placement or storage of the remote unit. As shown in the Figures, the handle 130 has a bent, hooked or C-shaped configuration so that it may be removably, hangingly placed, e.g., hanging from the grill cover handle 16. The handle 130 is movable from a folded position as shown in FIG. 5, to an unfolded or extended position as shown in FIGS. 1 and 6. As seen in FIG. 6, the case 110 may contain a recess 132 to receive the handle 130 in the folded position so that the handle 130 is substantially flush with the case. The handle 130 is rotatably connected to the case 110 by a hinge 135. The handle 130 may be rotated or placed into multiple positions between a completely folded position (FIG. 5) and a completely extended position. For example, in FIG. 7, the handle 130 is rotated into a position that supports the remove unit 100 in a partially upright position on a base 50, similar to a picture frame. The handle 130 may be maintained in a desired position by use of detents in the hinge 135, the rotational friction of the hinge 135, or by other means as will be understood by those of ordinary skill.

Those in the art should appreciate that the handle 130 may take many different forms, shapes and configurations. For example, in some embodiments the handle 130 is fixed in one position. In yet other embodiments, the handle 130 may be movably connected to the remote unit 100 by means other than a hinge. For example, the handle 135 may be slidingly connected to the remote unit so that it may be slid from a retracted or closed position to an extended or open position. Those skilled in the art will appreciate the various configurations of connections and movement of the handle that may be utilized in the present invention.

The case 110 may contain one or more cavities 142, 145 facilitating the storage and carrying of the sensor 30. As seen in the Figures, cavities 142 receive the cable 35 and cavity 145 receives at least a portion of the sensing portion 32. In this manner, the cable 35 and/or sensing portion 32 are maintained in compact condition with the remote unit 100.

Figure 2:
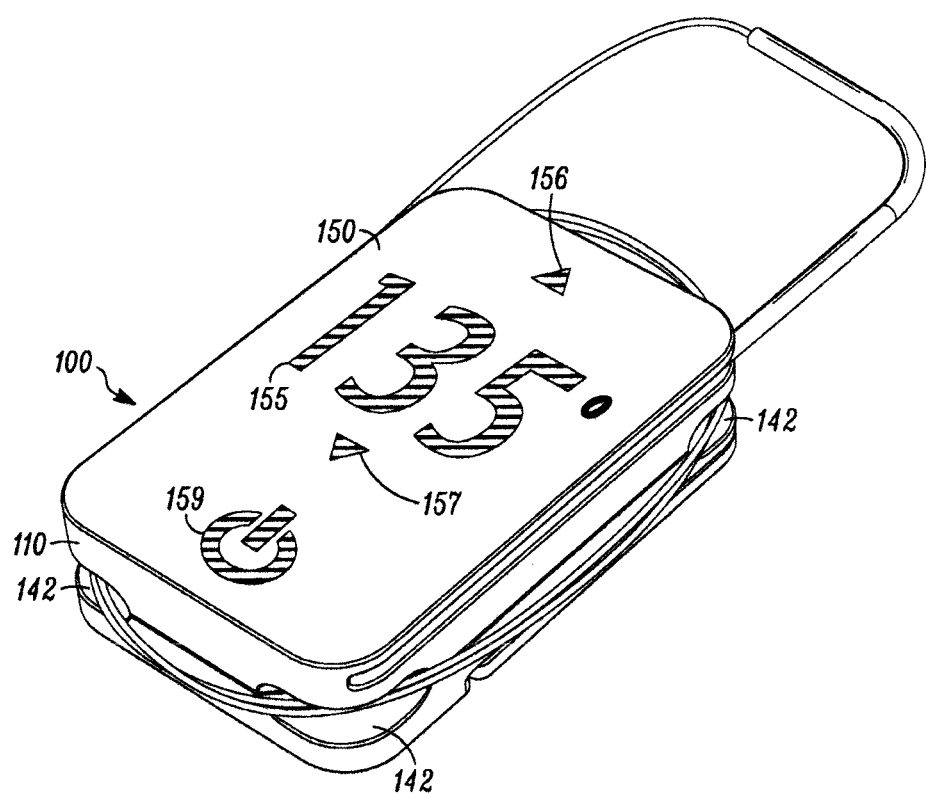
FIG. 2 is a front perspective view of an embodiment of a remote unit in accordance with present disclosure.
Figure 3:
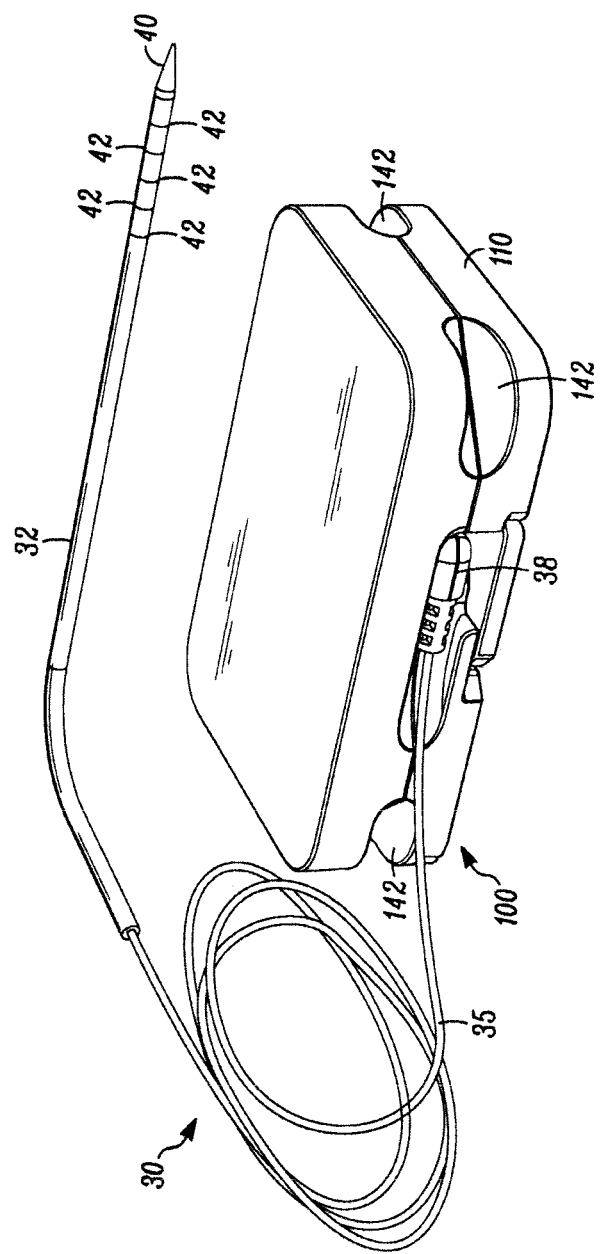
FIG. 3 is another front perspective view of the remote unit of FIG. 1.
Figure 4:
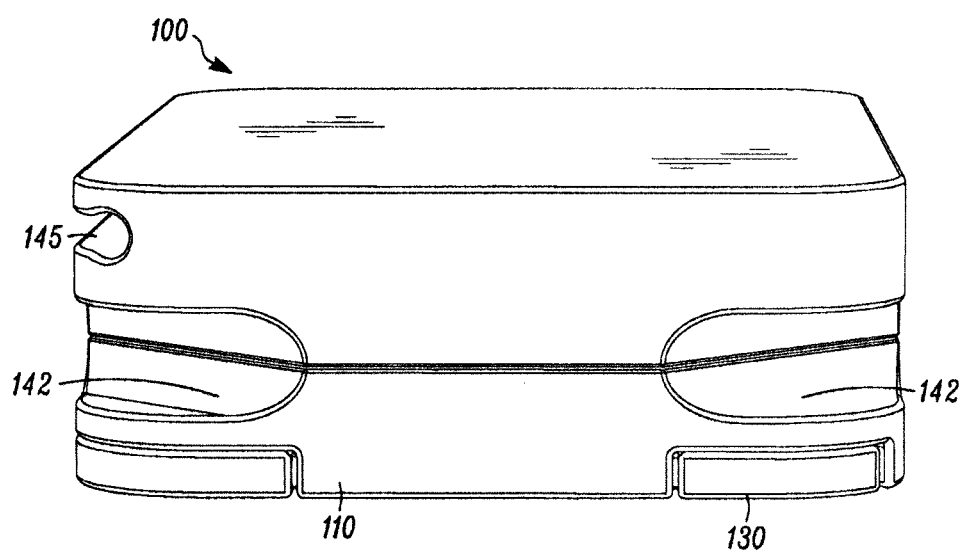
FIG. 4 is a top view of the remote unit of FIG. 1.

The remote unit 100 may contain a user interface 150 that displays information to the user and/or allows the user to control various functions of the remote unit 100. For example, the user interface 150 may display the current sensed temperature 155 of the food, as shown in FIG. 1. The interface 150 may also display the desired temperature or set temperature 155 of the food as shown in FIG. 2. In some embodiments, the user may alter the set temperature on the remote unit. This may be done by various methods, as will be understood by those of ordinary skill in art, such as, e.g., by entering the temperature on a keypad or using an up button 156 or down button 157 on the interface. When a user presses the up or down buttons 156, 157, the remote unit 150 raises or lowers, respectively, the set temperature, e.g., by a predetermined interval, such as, for example, five degree increments. The remote unit may then communicate the new set temperature to the control unit 200 as described further below.

The user interface 150 may contain additional functionality as desired. For example, as seen in FIG. 2, the user interface 150 contains a power or on/off button 159, which the user can use to turn the remote unit 100 on and off. In yet further embodiments, the user can use the power button 159, or alternatively, other means that one of ordinary skill in the art will understand, to activate or deactivate a standby mode in which the remove unit 100 continues to operate but dims or deactivates the display to conserve power. The power button 159 may indicate, by color, intensity or otherwise, the power state of the remote unit 100, as will be understood by those in the art.

As those of ordinary skill will appreciate, the user interface 150 may have various different configurations. For example, the buttons 156, 157, 159 or keypad may be mechanical or electromechanical in nature, e.g., switches. The temperature display 155 may be, for example, an LED, LCD, plasma or other type of display. In some embodiments, the user interface, or parts thereof, may be a touch sensor or touch screen interface, as is known, where the temperature display 155, keypad/keyboard, buttons 156, 157, 159 and other controls are virtual in nature and may be altered or modified. In such embodiments, for example, the user could toggle between the current sensed temperature 155 of the food and the set temperature 155 by touching the display, e.g., the temperature 155. In yet further embodiments, the remote unit 100 can dim or turn off the user interface 150 after a predetermined interval of non-use or in a power conservation mode, and then reactivate the interface 150 upon the user touching the interface 150.

Figure 7:
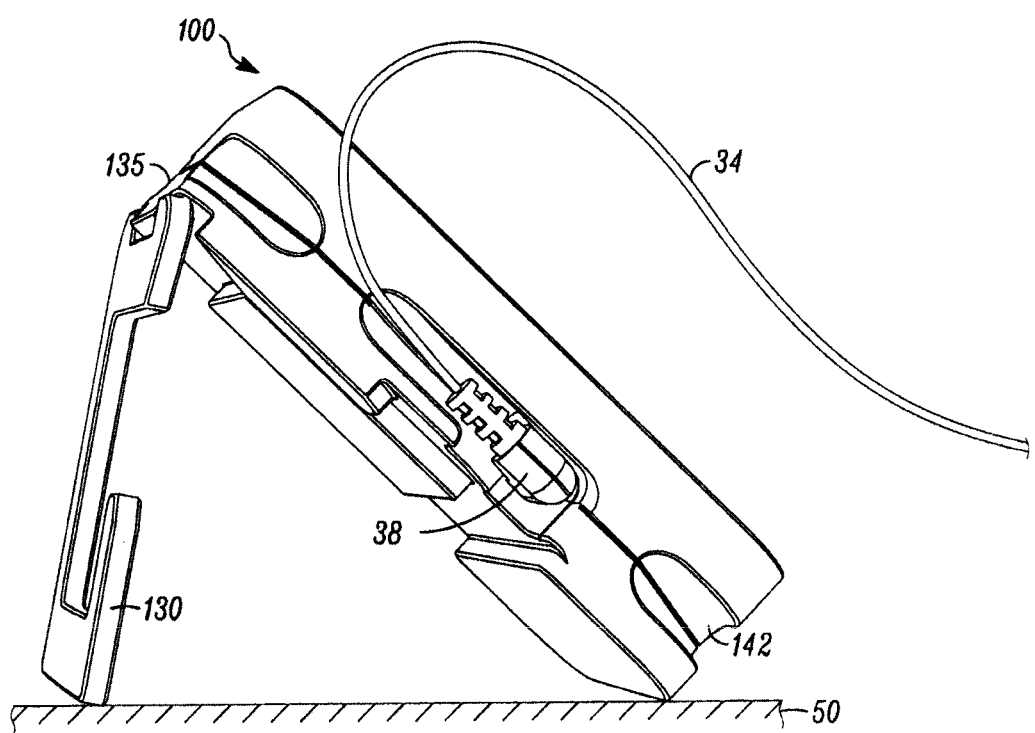
FIG. 7 is a side view of remote unit of FIG. 1 with the unit handle in another extended position.
Figure 7A:
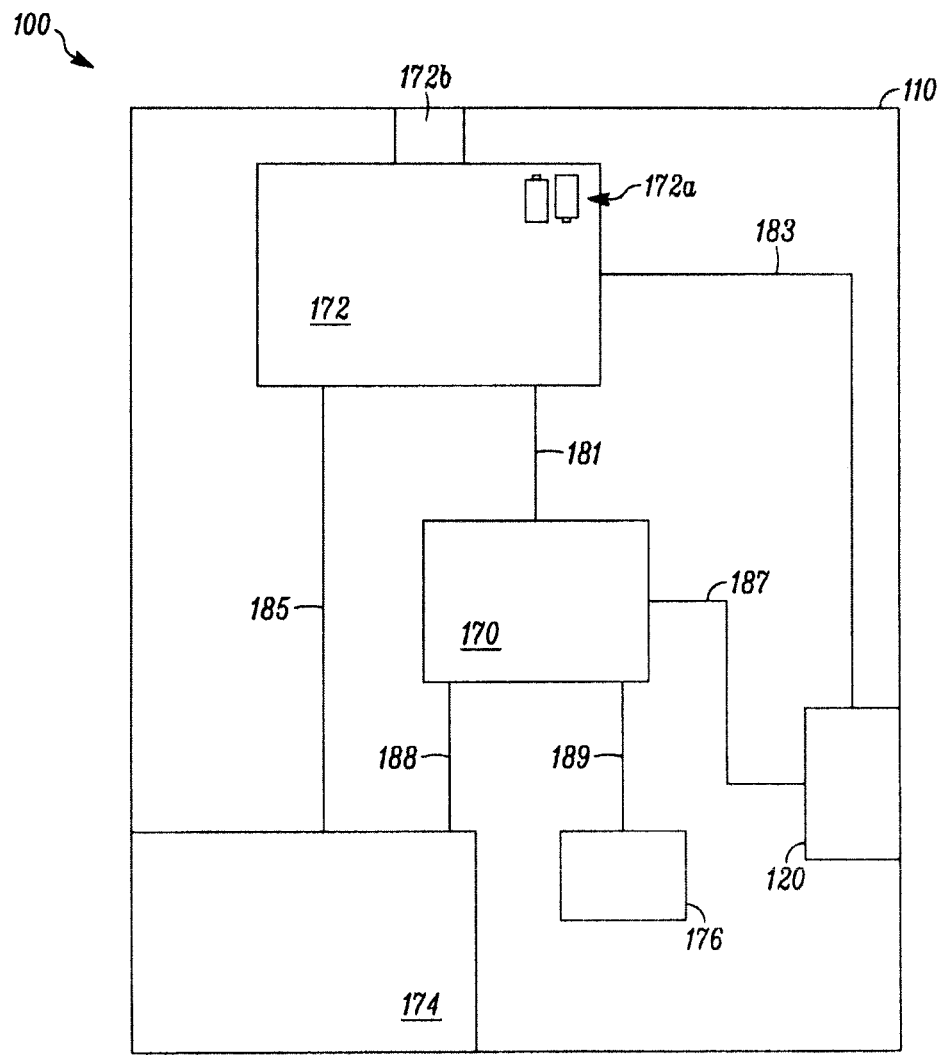
FIG. 7A is a schematic view of the interior of the remote unit of FIG. 1.

As seen in FIG. 7A, the operation of the remote unit 100 is controlled by one or more processors 170. A power supply 172 supplies power the processor(s) 170, the receptacle 120, and a communication unit 174 via power connections 181, 183 and 185, respectively. Communication between the processor 170, receptacle 120 and communication unit 174 take places place via communication lines 187, 188, respectively. Suitable processors 170 include, but are not limited to, processors available from Texas Instruments Inc. (TI MSF430) of Dallas, Tex. Further, in order to use the remote unit 100 with certain control units 200, an identification or authentication chip 176 may be utilized so that the control unit 200 will recognize and communicate with the remote unit 100. For example, where the control unit 200 is an Apple Inc. (Cupertino, Calif.) product, e.g., an IPHONE, IPAD, IPOD, ITOUCH, etc., the remote unit 100 may contain an Apple identification chip. Communication between the processor 170 and authentication chip 176 takes place via communication line 189.

The power supply 172 may include or be operatively connected to any suitable power source sufficient to supply power to the remote unit 100. In some embodiments, the power supply may include a battery or batteries 172a. The battery 172 may be a rechargeable or nonrechargeable battery that can be removed from the remote unit 100 when depleted, or a rechargeable battery that generally remains within the remote unit 100 and is recharged via a power jack 172b connectable to an external power source, e.g., an electrical outlet. Alternatively, the power supply 172 may receive power directly from an external power source without utilizing a battery.

Under the control of the processor 170, the communication unit 174 transmits information to, and in some embodiments, may receive information from the control unit 200. The remote unit 100 transmits the currently sensed temperature 155 to the control unit 200 for utilization by the control unit 200 as further discussed below. In addition, in embodiments where the user can alter the set temperature 155 using the remote unit 100, the revised set temperature may be transmitted to the control unit 200. These transmissions may be made by any suitable transmission methods as will be appreciated by those of ordinary skill in the art. Examples of such methods include, but are limited to, Bluetooth, radio frequency, infrared and wireless network (e.g., IEEE 802.11/a/b/g/n) protocols. Suitable wireless components include, but are not limited to, Bluetooth modules with Class 2 power output, implementing at least Bluetooth specification V2.0+ EDR (Enhanced Data Rate) compliance. Suitable modules include, but are not limited to, modules from ZBA Inc. (BT44-191S) of Hillsborough, N.J., Bluegiga Technologies Inc. (WT12) of Duluth, Ga., and Laird Technologies (BTM411) of St. Louis, Mo. In other embodiments, the remote unit 100 may communicate with the control unit 200 through a wired connection, e.g., a hard-wire or wired network connection, or a combination of wired and wireless connection(s). Those of ordinary skill in the art will understand how to construct and implement the remote unit 100 so as to communicate with the control unit 200 as discussed herein.

The temperature 155 may be communicated to the control unit 200 utilizing a "push" protocol, in which the temperature 155 is communicated to the control unit without a query or request from the control unit 200 to do so. The temperature 155 may be transmitted to the control unit 200 continuously. Alternatively, the temperature 155 may be transmitted to the control unit 200 at intervals in order to conserve power or minimize processing time the control unit 200 must dedicate to the cooking application. The transmission interval may be pre-set or definable, e.g., every 1 to 10 seconds, such, for example, every 5 seconds. However, it should be understood that whether continuous or interval transmission is used may depend on the food item 5 being cooked or heated, or the degree of cooking/heating, and the cooking method 10. For example, for a food item that is being cooked or heated very quickly, or is expected to reach its desired temperature quickly, it may be desirable to implement continuous transmission or short intervals. On the other hand, a food item 5 that is being heated very slowly or is expected to cook for a long time (e.g., hours), a longer interval, e.g., several minutes, may be suitable. Those of ordinary skill should understand how to implement a suitable transmission schedule.

In other embodiments, the temperature 155 transmission may implement a "pull" protocol, where the temperature is communicated to the control unit 200 when the control unit 200 communicates, and the remote unit 100 receives, a request or query from the control unit 200 (e.g., via communication unit 174) to relay the temperature 155. In this manner, the temperature 155 may be transmitted when the control unit requires or otherwise determines it is necessary to receive the temperature, conserving power and control unit 200 processing resources, e.g., based on the cooking and/or food profiles as discussed further below. In further embodiments, both "push" and "pull" protocols may be utilized.

As described above, the control unit 200 wirelessly receives data about the cooking process from the remote unit 100 and displays the data via the interface 300 in a useful manner to the user. As one example, the interface 300 may display the current temperature of the cooking item 5, as measured by the sensing portion 32 of the probe(s) 30. The control unit 200 can be relatively small to be portable and be able to be carried or moved by the user so that the user need not remain close to the control unit 200 and view, or be alerted by, the interface 300. The display means of the interface 300 may be any means, currently known or that later become known, capable of relaying the received data to the user, such as means that visually displays the data. In some embodiments, the interface 30 is an electronic screen that visually displays the data, such as a liquid crystal display or a plasma display. In the illustrated embodiment shown in FIGS. 8A-11, the interface 300 is a liquid crystal display. However, the interface 300 may any other means capable of communicating data to the user. For example, the interface 300 may include other visual display means (e.g., lights), audible display means (e.g., speakers), physical display means (e.g., vibration or other motion), and combinations thereof, instead of, or in addition to, a screen.

In some embodiments, the interface 300 only displays received data that is transmitted from the remote unit 200, such as the temperature of the cooking item 5, elapsed cooking time, whether the remote unit 100 is "on" and/or "connected" to the control unit 300, etc. In other embodiments, the interface 300 allows a user to input, selectively access and/or manipulate data or commands in addition to displaying received data. For example, if the control unit 200 is capable of storing and running computer programs or applications (e.g., includes at least some memory and a processor), the interface 300 may allow a user to access a program that manages the connection between the control unit 200 and the remote unit 100. In some embodiments, the interface 300 also displays and allows users to access or manipulate data that is retrieved, accessed and/or computed by the control unit 200. For example, the interface 300 may display data that is computed or extrapolated by the program or application from data that is received from the remote unit 100, entered by the user and/or otherwise obtained or entered into the control unit 200 and/or the program/application. In some such embodiments, the control unit 200/interface 300 includes input means for accessing the program, inputting data or otherwise communicating with the control unit 300. Such input means may be any means, currently known or that later becomes known, capable of allowing a user to input data, enter commands, access data stored in, or accessible by, the control unit 200, and combination thereof. For example, the input means may be a keyboard, mouse, trackball, touch-screen, microphone, motion sensor, light sensor, etc., and may be part of, or combined with, the display means of the interface 300. In the illustrated embodiment shown in FIGS. 8A-11, the interface 300 is touch-screen including the liquid crystal display and a digitizer coupled thereto. In one such embodiment, the control unit 200 is an Apple® iPhone® and the interface 300 is the touch-screen of the iPhone®.

As shown in FIGS. 8A-11 and described above, the illustrated embodiment of the control unit 200 includes a touch screen that displays, and allows a user to access and run, a program that manages the connection between the remote unit 100 and the control unit 200 and receives, stores, manages and displays the data/commands transmitted by the remote unit 100 and/or input by the user. The program or application should preferably be easy to learn and use, and load quickly and run reliably. The application may display text (in English and/or any other language), pictures and/or video. The application may be preprogrammed on the control unit 200, or may be obtained (such as downloaded via the interne or other means) as an aftermarket add-on to an existing device that is capable of running the application and performing the other functions (e.g., wirelessly communicating with the remote unit 100) of the control unit 200 (e.g., an Apple® iPhone®, any other smart phone or any device with an interface and the ability to obtain and run a program or application).

One function of the application may be to manage the wireless connection between the remote unit 100 and the control unit 200 (e.g., via a BLUETOOTH (short length radio waves) based connection, as described above). In one embodiment, when the application is accessed by the user it automatically "searches" for the signal emitted by the remote unit 100 and either automatically "connects" or "syncs" to the signal, or prompts the user via the interface 300 to make the connection (e.g., by selecting a "connect" or "sync" link or icon displayed on the interface 300). In other embodiments, the user is prompted or manually commands the application to connect or sync with the remote unit 100. Such a prompt may occur soon after the application is opened or loaded by the user. Further, an indication that the sync or connection between the remote unit 100 and the control unit 200 was successful or not may be displayed, at least just after the "sync" or "connection" is attempted, so that the user knows whether or not the sync or connection was successful.

In some embodiments, the application further includes a connection drop notification feature. The connection drop notification feature includes a communication to the user via the interface 300 (e.g., a blinking light, vibration or visual notification) that a previously established connection between the remote unit 100 and the control unit 200 has been "dropped" or has otherwise failed (and thus the control unit 200 no longer receiving data from the remote unit 100, such as the temperature of the cooking item 5). The connection drop notification feature may check or test the connection at predetermined set time intervals after a connection has been established, such as every 30 seconds, minute, 2.5 minutes, 5 minutes or any other time internal. In other embodiments, the connection drop notification feature may be initiated when the application detects a drop in the amount of received data that is beyond a predetermined data set point or a set point that is calculated by the application based on the average amount of data received over a certain time frame after the "connection" was initially established. In some embodiments, the connection drop notification includes a connection monitor that can be accessed by the user or is continuously displayed on the interface 300, which evaluates and displays the strength and/or quality of the connection. The connection monitor may thereby allow a user to determine which locations of the control unit 200, in respect to the location of the remote unit 100, may be more or less likely prone to a connection failure.

In some embodiments, the application includes an event log feature that saves the data received from the remote unit 100 before a connection is lost or dropped. For example, the event log feature may save and display the estimated "finish" time and the amount of time between the current time and the estimated "finish" time (as explained in further detail below), and alert the user via the interface 300 before (e.g., approximately five minutes before) the estimated "finish" time and at the estimated "finish" time. Thereby, the event log feature prevents against a failed connection from completely disabling the alert feature of the control unit 300/program (to ensure that the user does not mistakenly overcook the cooking item 5) by providing an alert based on the estimated "finish" time.

As shown in FIGS. 8A-11, the program displayed on the interface 300 of the control unit 200 allows the user to view the data received from the remote unit 100 and enter and view further information about the cooking process. The primary "home" screen of the program may only be available to the user when a connection with the remote unit 100 is established. However, in other embodiments the "home" screen will be available to the user regardless of the connection status, so that the user can setup the program before cooking has even begun. FIGS. 8A-11 illustrate an exemplary "home" screen or main menus. The "home" screen may be arranged such that a menu bar 302 (e.g., a series of links or buttons) is displayed on a portion of the interface 300. In some embodiments, the menu bar 302 is always displayed on the interface 300 (e.g., across an upper portion of the interface 300). In such an arrangement, the menu bar 302 provides several tabs, buttons or links (e.g., icons and/or text) that are accessible to the user regardless of what is being displayed on the interface 300 (while the application is running). This arrangement provides quick and easy navigation through the application. The menu bar 302 may contain several tabs that reflect different categories of information that can be viewed by selecting the tabs. The information relating to each tabbed category may be viewed in the portion 304 of the interface 300 that is not taken up by the menu bar 302. In the illustrated embodiment, the menu bar 302 is displayed across the top portion of the interface 300 and the detailed information section 304 is displayed below the menu bar 302 in the remaining available portion of the interface 300.

As shown in the illustrated embodiment, the tabbed categories of information on the menu bar 302 may include stats 306 relating to the cooking item 5 and cooking process, tips 308, recipes 310 and a browser 312. However, these categories are only exemplary, and any other categories that are known, or that later become known, may equally be employed. For example, other categories relating to the cooking item 5 (e.g., a meat), method (e.g., barbeque, stove, grill, etc.), style (e.g., Cajun), equipment (e.g., coal burning barbeque), technique (e.g., rotisserie), occasion (e.g., a particular holiday), location (e.g., a location that carries a particular food connotation or style), safety (e.g., how to properly prepare or handle a certain cooking item 5), menu (e.g., shopping list associated with a particular menu), audience (e.g., children), etc.

Figure 8C:
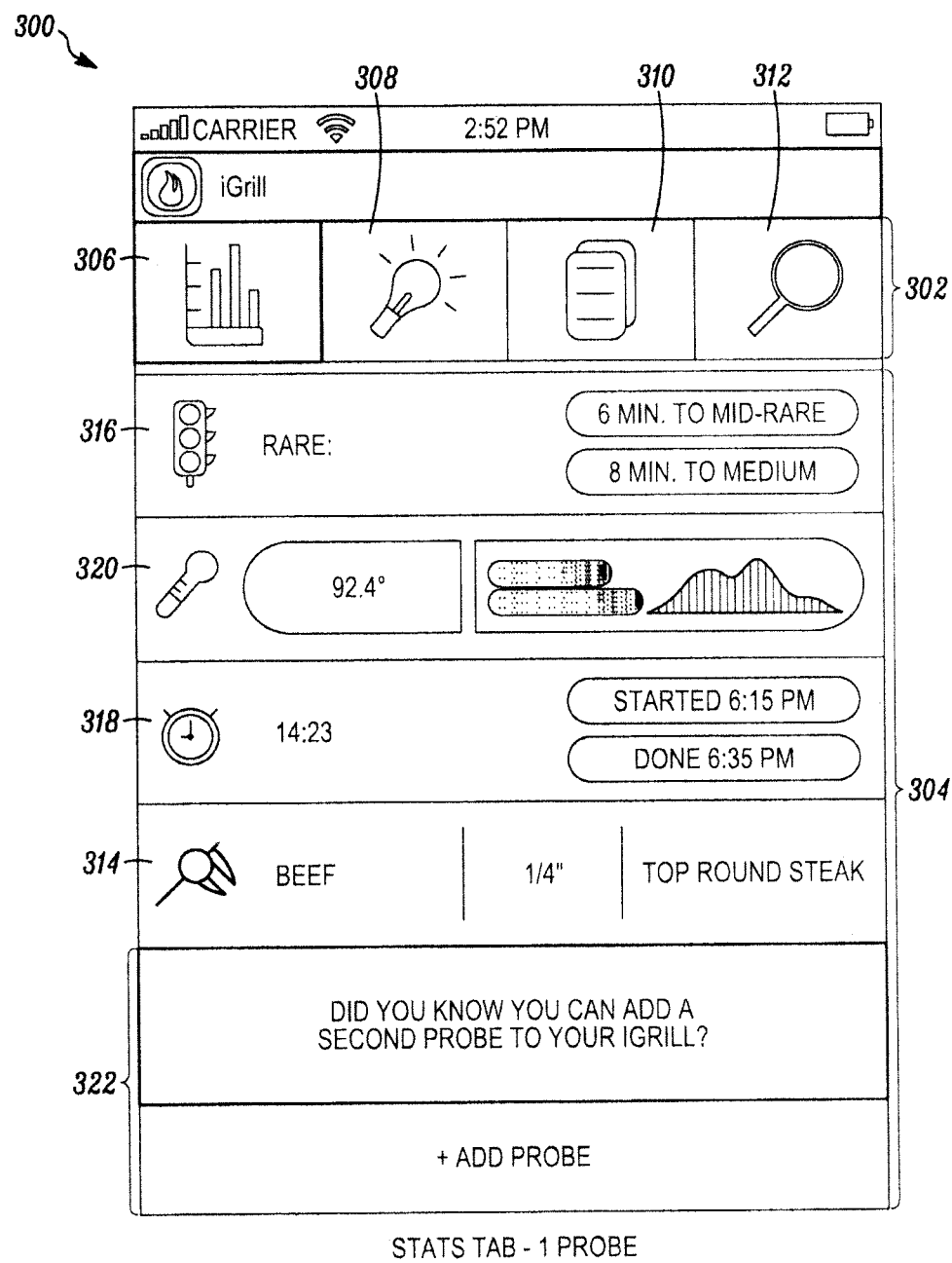
FIG. 8C is schematic of a third mode of the user interface of the control unit of FIG. 1.

FIGS. 8A-8C illustrate exemplary detailed information sections 304 of the stats category 306. The exemplary detailed information sections 304 of the stats category 306 include several types of information that a user would find helpful or informative during a cooking process. The stats category 306 of the illustrated embodiment includes information about the cooking item's profile 314, current status 316, cooking time 318 and temperature 320. However, these types of information are only exemplary, and any other type of information about the cooking item 5 or the cooking process that are known, or that later become known, may equally be employed. The types of information may be delineated from one another and displayed on the interface 300 by text and/or graphics so that a user can quickly and accurately view and become aware of the different types of information.

The cooking item's profile 314 may include (and display) information relating to the actual cooking item 5. For example, the cooking item's profile 314 can include the type of cooking item 5 (e.g., a particular type of meat, poultry, fish, vegetable, fruit, etc.), information about the actual cooking item 5 (e.g., the specific cut of the meat, poultry part, fish, vegetable, fruit, etc.), and information about the physical attributes of the cooking item 5 (e.g., thickness, weight, length, volume, area, etc.). These types or categories of information are exemplary, and any other type of information that may be beneficial in determining how the cooking item 5 should be prepared (e.g., heated) may equally be employed. The cooking item's profile 314 is particularly advantageous because it can be used to determine the specific ultimate temperature that the cooking item 5 must reach to be safe to eat (e.g., the temperature at which harmful bacteria have been destroyed) and when the cooking item 5 is prepared to a particular user's taste (e.g., the graduation of the cooking amount, such as rare, medium, well-done, etc.). For example, some embodiments use data (e.g., an internal temperature cooking chart or table) that is either provided by the application (e.g., saved in the memory of the control unit 200) or accessed by the program (e.g., via the internet) regarding the USDA's or other suggested correct (cooked) temperatures for all possible cooking graduations of all possible cooking item profiles 314. In some such embodiments, the application can parse the data to match the correct USDA temperature (e.g., internal temperature) with the cooking item's profile 314. As an example, if a cooking item's profile matches that of the cooking item's profile 314 shown in FIG. 8C (i.e., beef, ¼ inch thick, top round steak) and the user indicates that they prefer the cooking item 5 be cooked to "medium," the application may use the cooking item's profile 314 in comparison to the USDA data to determine the correct ultimate temperature of a ¼ inch thick, top round beef steak cooked to "medium."

Another advantageous feature of the application and the cooking item's profile 314 (e.g., the desired ultimate temperature (e.g., internal temperature) of the cooking item 5) is that that the application can trigger the user interface 300 to alert the user when the actual, current internal temperature of the cooking item 5 has reached the user's desired ultimate internal temperature or cooking condition (e.g., a temperature corresponding to a particular cooking graduation). For example, the program may alert the user via the interface 300 (e.g., display a message on the interface 300, vibrate, display blinking lights, play a sound(s), etc.) when the sensing portion 32 of the probe(s) 30 indicates that the current, internal temperature of the cooking item 5 has reached the user's desired ultimate internal temperature. In this manner, the remote unit 100, control unit 200, interface 300 and/or application prevent the user from over-cooking or under-cooking the cooking item 5, but rather alerts the user when the cooking item 5 has been cooked to the user's liking (i.e., the cooking item's profile 314). As another example, and as explained in further detail in the "current status 316" section below, the application also may trigger the user interface 300 to alert the user that the internal temperature of the cooking item 5 will be reaching the user's desired internal temperature in a set time period (e.g., the user's desired ultimate temperature will be reached in about five minutes).

The cooking item's profile 314 may be input by the user via the interface 300 into the program at the "home" or other screen (as shown in FIGS. 8*a*-11), or may be input prior to loading of such a screen. In some embodiments, when the program is initially loaded (i.e., accessed), the program may default to a series of questions or prompts that ask the user about the item they are cooking with the remote unit 100 and control unit 200. These prompts can correspond to the categories of the cooking item's profile 314 described above, such as the type of cooking item 5, the specific cooking item 5, the physical attributes of the item, and the preferred cooking graduation (e.g., rare, medium, well-done, etc.). In some such embodiments, the user can select from a preloaded or accessed menu (e.g., a drop-down menu) that includes potential appropriate characteristics to facilitate the user's selection of the particular cooking item 5 characteristic that corresponds to the cooking item 5 they wish to prepare. In other embodiments, a keyboard (which may be a virtual touch-screen keyboard) or other input means associated with the interface 300 may be used to input the characteristic. In some embodiments, the user may input the detailed information relating to the cooking item's profile 314 at the "home" screen of the stats tab 306. For example, the user may select (e.g., touch or otherwise select) the cooking item's profile 314 section of the interface 300 to "open up" or otherwise access a menu or other input screen so that the user can enter the particular cooking item's profile. The section of the interface 300 corresponding to the cooking item's profile 314 may display all or some of the characteristics of the cooking item 5 that the user inputted. For example, as shown in FIG. 8C, the cooking item's profile 314 of the illustrated embodiment displays the type of cooking item 5 (i.e., beef), a physical attribute of the cooking item 5 (i.e., ¼ inch thick), and information about the actual cooking item 5 (i.e., top round steak).

In some embodiments, the user is able to input the specific temperature to which they they wish to heat the cooking item 5, instead of, or in addition to, the cooking item's profile 314. For example, if the user knows the temperature they would like their cooking item 5 to reach, the user would not need to enter the cooking item's profile 314 to determine such temperature. In some embodiments, the application and interface 300 would also allow the user to change the cooking item's profile 314 (e.g., the ultimate internal temperature of the cooking item 5) during cooking (e.g., a change from rare to medium). In some such embodiments, the program may allow the user to simply adjust the desired internal temperature of the cooking item 5, such as by increasing or decreasing the temperature degree-by-degree or degree interval (e.g., by entering a new temperature or by selecting a button, link, icon or the like on the interface 300 to increase or decrease the ultimate internal temperature). As explained above, if the ultimate temperature is changed (or even initially set) at the remote unit 100, the remote unit 100 may transmit the desired ultimate temperature to the control unit 100 and the program would automatically be updated with the adjusted desired ultimate temperature.

The cooking item's temperature 320 displayed on the interface 300 may include information relating to the current temperature (e.g., interior) of the cooking item 5. As described above, the sensing portion 32 of the probe(s) 30 can be used to measure the actual, current temperature (e.g., internal) of the cooking item 5, and the remote unit 100 used to transmit the temperature data to the control unit 200. As discussed above, the remote unit 100 may transmit the actual, current temperature reading of the cooking item 5 at intervals, e.g., about every five seconds. However, any other time internal may equally be employed. Similarly, as discussed above, the control unit 200 and/or application may request a temperature reading from the remote unit 100 at set time intervals and/or by a specific command or request by the user that is in addition to, or instead of, the remote unit 100 automatically sending the temperature reading at set time intervals. The cooking item's temperature 320 may also display the temperature trend on the cooking item 5, and/or the current temperature reading as compared to the user's desired ultimate temperature. See, e.g., cooking item's temperature 320 of FIG. 8C.

As also shown in FIG. 8C, the cooking item's current status 316 on the interface 300 may indicate the current cooking graduation (e.g., rare, medium, well-done, etc.) of the cooking item 5. In some embodiments, the application may determine the current cooking graduation in substantially the same ways as the correct ultimate cooking temperature is determined, except that the application uses the current temperature and at least some of the cooking item's profile 314 in comparison to the cooking graduation data (e.g., USDA graduated cooking data) to determine the current, actual cooking graduation of the cooking item (according to the data). In some embodiments, the cooking item's current status 316 may also calculate and display an estimated time frame of when the cooking item 5 will reach the desired cooking graduation, as well as other cooking graduations. In some such embodiments, the time frame estimates for the yet-to-be-achieved cooking graduations may be calculated by using prior actual temperature readings and the desired temperature (which was either entered by the user or determined from the cooking item's profile 314 as explained above). For example, the application may calculate the number of degrees that prior temperature readings rose every two minutes during the cooking operation and extrapolate the duration of time it will take for the cooking item's temperature to read the desired, ultimate temperature (e.g., determine difference between the actual temperature and the desired temperature, the average temperature change per minute, and divide the temperature difference by the average temperature change per minute). However, any other method for estimating or extrapolating the time frame estimates for the yet to be achieved cooking graduations that are known, or that later become known, equally may be employed, as will be apparent by those skilled in the art. In some embodiments, when the estimated time frame of when the cooking item 5 will reach temperature (e.g., cooking graduation) reaches a certain predetermined or user selected time interval (e.g., five minutes), the program activates the interface 300 to alert the user that the cooking item 5 is almost fully cooked, according to the cooking item's profile 314.

Similar to how the alert is triggered when the temperature of the cooking item 5 approaches or reaches the correct ultimate temperature determined by the cooking item's profile 314, in some embodiments the application may trigger the interface 300 to alert the user when the temperature of the cooking item 5 surpasses the correct ultimate temperature (e.g., by a predetermined or user selected temperature difference, such as 15 degrees). In some embodiments, the application alerts the user when the temperature of the cooking item 5 falls below a certain temperature (e.g., a predetermined or user selected temperature). In some embodiments, the application alerts the user when the estimated time until the cooking item 5 reaches the ultimate correct temperature surpasses a certain time limit (e.g., a predetermined or user selected time limit, such as one hour)

The timer 318 on the interface 300 may include the current cooking time duration, the time that the cooking process began, and/or the estimated time at which the cooking process should be complete according to the cooking item's profile 314 (to achieve the desired cooking graduation). In some embodiments, the cooking duration is calculated by the program by recording the time at which the cooking process began, and subtracting the starting time as compared to the current time. In some such embodiments, the program may record, or is aware of, the times through the use of an internal clock that is present in by the control device 200 and/or accessed by the control device 200 or the program, such as via the internet. In some embodiments, the elapsed time is calculated by recording the time at which the temperature started to increase above a predetermined level (e.g., above normal ambient temperatures) or when the user indicated that the cooking process began (such as in response to a prompt), and subtracting such time from the current time. In yet another embodiment, the elapsed time is calculated by initiating a timer when the cooking process began. The start time may similarly be determined or recorded. The estimated time at which the cooking process should be complete according to the cooking item's profile 314 may be calculated in a substantially similar manner as the time frames regarding the yet to be achieved cooking graduations, as discussed above with respect to the cooking item's current status 316.

As shown in FIGS. 8A and 8C, the interface 300 may include an additional probe option 322 that allows the user to use a second probe 30 with the remote unit 100, as discussed above. In the illustrated embodiment, the additional probe option 322 prompts the user to connect and configure a second probe 30 and a second temperature location, e.g., a second cooking item 5 (such as inputting the second cooking item's profile 314). After the second probe 30 is successfully added to the remote unit 100, and the second cooking item's profile 314 is entered into the program, the information about the second cooking item 5 is monitored and displayed on the detailed information section 304 in a substantially similar manner as the information regarding the first cooking item 5, including calculating and displaying information about the second cooking item's profile 314', current status 316', timer 318' and temperature 320', as shown in FIG. 8B.

FIGS. 9A-9D illustrate exemplary detailed information sections 304 of the tips category 308. The exemplary detailed information sections 304 of the tips category 308 include several types of tips that a user would find helpful or informative during a cooking process. It is noted that the menu bar 302 remains located at the top portion of the interface 300, and the detailed information sections 304 is located beneath the menu bar 302. However, in addition to the menu bar 302 and detailed information sections 304, a quickstats bar 324 is positioned below the detailed information sections 304. The quickstats bar 324 provides at least some of the detailed information section 304 of the stats category 306, such as the information that a user would find most helpful or informative during a cooking process. In the illustrated embodiments, the quickstats bar 324 includes information about the current status 316 (e.g., the current cooking graduation), timer 318 (e.g., the elapsed cooking time), and the temperature 320 (e.g., the current temperature of the cooking item 5).

Figures 9A, 9B:
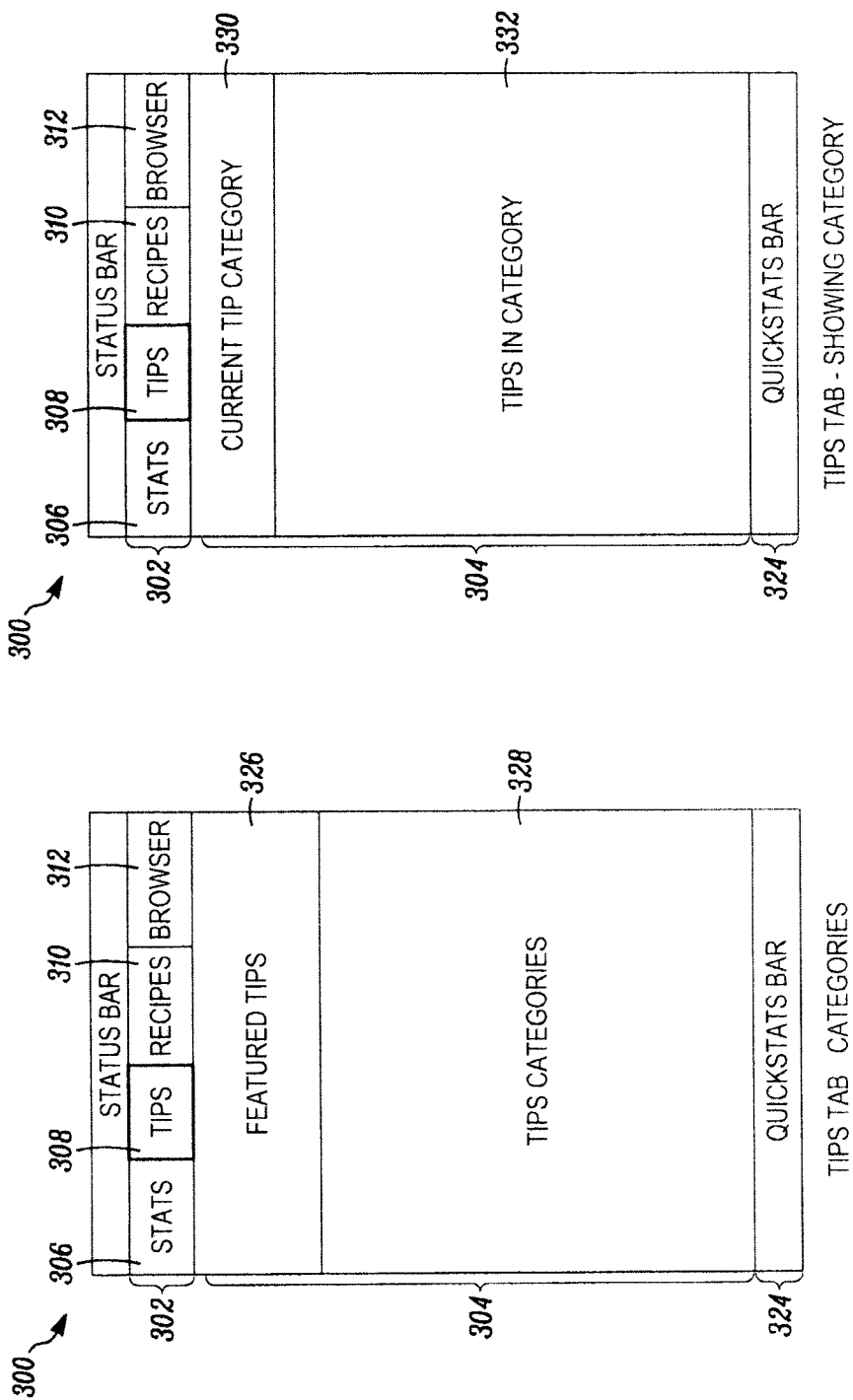
FIG. 9A is schematic of a fourth mode of the user interface of the control unit of FIG. 1.
FIG. 9B is schematic of a fifth mode of the user interface of the control unit of FIG. 1.
Figure 9C:
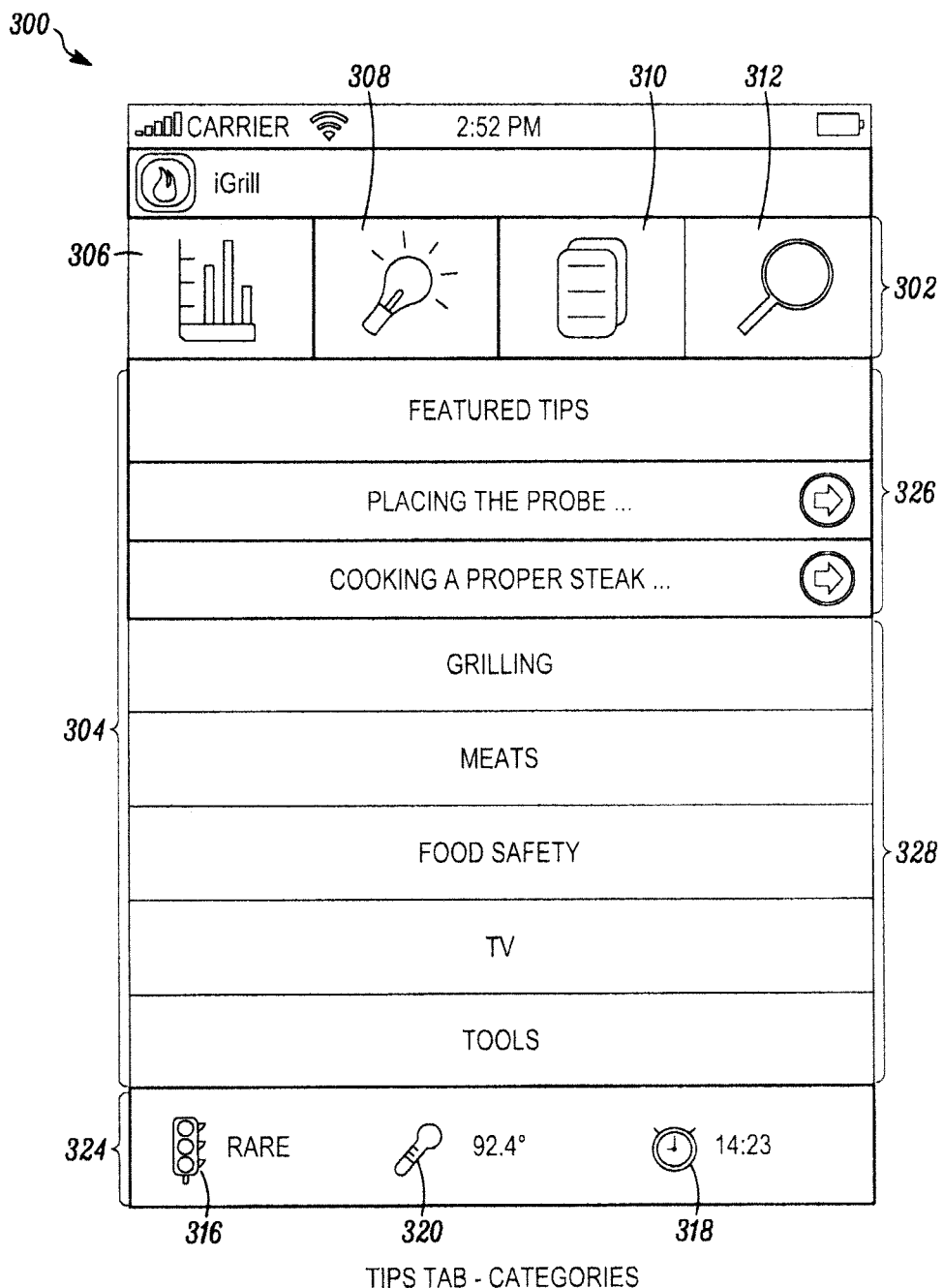
FIG. 9C is schematic of a sixth mode of the user interface of the control unit of FIG. 1.

As shown in the exemplary illustrated embodiment of FIGS. 9A and 9C, the detailed information sections 304 of the "home" page of the tips category 308 includes a featured tips section 326 and a tips categories section 328. Each section includes links, buttons or other means of allowing the user to access the section to either view a featured tip or view tips in certain categories. In some embodiments, the featured tips section 326 includes tips that are most commonly used/sought or that would likely be the most advantageous for a user. For example, the featured tips section 326 may include tips relating to the placement of the probe(s) 30 or how to cook a proper steak. The tips categories section 328 includes categories of tips that relate to food preparation, cooking, safety, TV or video, tools, or any other category that a user would find beneficial to the use of the device or cooking in general. In some embodiments, as shown in FIG. 9B, when a user selects a tip category from the categories section 328, the category label 330 and a series of tips 332 falling within that category are displayed in the detailed information sections 304.

The individual tips displayed in the detailed information sections 304 (whether the are selected from the featured tips section 326 or the series of tips 332) may take on any format that is capable of relaying the tip to the user, such as video, picture, text, audio or any other means. In this regard, the application may utilize the existing audio, video, etc. capabilities of the control unit 200. In the illustrated embodiment shown in FIG. 9D, the selected tip title 334, a tip image or video 336 and tip text 338 are all displayed in the detailed information sections 304 when a tip is selected by the user. In some embodiments, the tip title 334 is the title of the selected tip, the tip image or video 336 in an image or video displayed by the application/interface 300 that visually shows or explains the substance of the selected tip, and the tip text 338 is text that also explains the substance of the selected tip. The featured tips 326, tip categories 328, tips 304, tip titles 334, tip images/video 336 and/or tip text 338, any other section, or combinations thereof, may be provided by the control unit 300 (e.g., memory) or may be accessed or obtained by the control unit (e.g., via the internet).

Similar to the tips category 308, FIGS. 10A-10C illustrate exemplary detailed information sections 304 of the recipes category 310. The exemplary detailed information sections 304 of the recipe category 310 include recipes that a user can utilize, such as recipes that lend themselves for use with the remote unit 100 and control unit 200. It is noted that the menu bar 302 remains located at the top portion of the interface 300, the detailed information section 304 is located beneath the menu bar 302, and the quickstats bar 324 is positioned below the detailed information sections 304.

As shown in the exemplary illustrated embodiment of FIGS. 10A-10C, the detailed information sections 304 of the "home" page of the recipe category 310 includes a featured recipes section 340 and a recipe categories section 342. Each section includes links, buttons or other means of allowing the user to access the section to either view a featured recipe or view recipes in certain categories. In some embodiments, the featured recipes section 340 includes recipes that are most commonly used/sought or that would likely be the most advantageous for a user. For example, the featured recipe section 340 may include recipes relating to the time of year, location of the user, etc. This information may be input by the user, or in alternative embodiments where the control unit 200 has such capabilities, e.g., a calendar functionality or GPS functionality, supplied automatically by the control unit. The recipe categories section 340 includes categories of recipes, such as recipes that share common ingredients, cooking techniques, ethnicity, health benefits, etc. In some embodiments, as shown in FIG. 10B, when a user selects a recipe category from the categories section 342, a recipe category label 344 and a series of titles of recipes 346 falling within that category are displayed in the detailed information section 304.

The individual recipes displayed in the detailed information section 304 (whether the are selected from the featured tips section 340 or the series of tips 346) may take on any for that is capable of relaying the recipe to the user, such as video, picture, text, audio or any other means. In the illustrated embodiment shown in FIG. 10C, the selected recipe title 348, a recipe image or video 350 and recipe text 352 are all displayed in the detailed information sections 304 when a recipe is selected by the user. In some embodiments, the recipe title 348 is the title of the selected tip, the tip image or video 350 in an image or video displayed by the application/interface 300 that visually shows or explains the substance of the selected recipe, and the recipe text 352 is text that also explains the substance of the selected tip. The featured recipe 340, recipe categories 342, recipes 346, recipe titles 348, recipe images/video 350 and/or recipe text 352, any other section, or combinations thereof, may be provided by the control unit 300 or may be accessed or obtained by the control unit (e.g., via the internet). In some embodiments, the provided recipes may include or generate a shopping list that includes all of the items that would be needed to prepare the meal. In one such embodiment, the program/control unit 300 generates a shopping list through user input, such as by the combination of recipes or changes to selected recipes.

Figure 11:
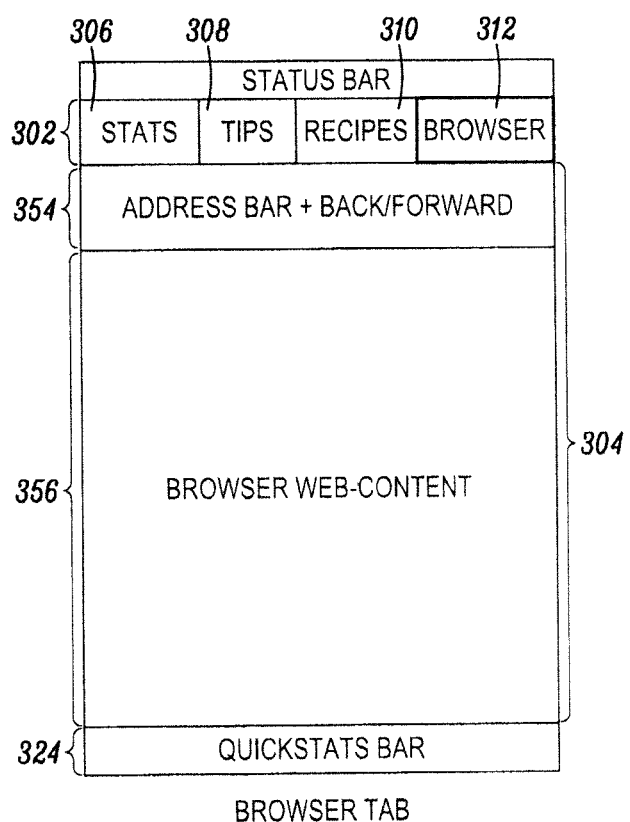
FIG. 11 is schematic of a eleventh mode of the user interface of the control unit of FIG. 1.

Similar to the tips category 308 and the recipe category 310, FIG. 11 illustrates exemplary detailed information section 304 of the browser category 312. It is noted that the menu bar 302 remains located at the top portion of the interface 300, the detailed information section 304 is located beneath the menu bar 302, and the quickstats bar 324 is positioned below the detailed information sections 304. As shown in the exemplary illustrated embodiment of FIG. 11, the detailed information sections 304 of the "home" page of the browser category 312 includes an address section 354 and a browser content section 356. The address section 354 is configured to allow the user to enter an internet address and navigate between web pages, such as through links or buttons (e.g., back/forward icons, favorites icon, refresh icon, homepage icon, etc.). When the browser category 312 is accessed by the user, a predetermined homepage may be displayed in the browser content section 356. Similarly, when the user enters a web address into the address section 354 and directs the control unit to navigate to the address, the web page at the address may be displayed in the browser content section 356. The browser category 312 may be particular advantageous because it allows the user to use the internet while still monitoring the status of the cooking prices through the quickstats bar 324 below the browser content section 356, i.e., without exiting the application.

Those skilled in the art should recognize that functionality of the control unit 200 may also be present in the remote unit 100. This applies to any or all of the functionality of the control unit as desired. By way of example only, the remote unit 100 may provide the user with an indication that the food 5 has reached the desired temperature or cooking status. As with the control unit 200, this may be a visual indication, e.g., a message or flashing indicator, an audio indication, e.g., a sound or alarm, a tactile indication, e.g., vibration, or other indication. In this manner, if the user is in the vicinity of the remote unit 100, or not in the vicinity of the control unit 200, the user can be notified of the cooking status. The remote unit 100 may determine the desired cooking status independently of the control unit 200, such as, for example, by determining that the sensed temperature has reached the temperature set on the device. In such embodiments, the remote unit 100 may used without the control unit 200. Alternatively, the control unit 200 may communicate that the desired temperature or cooking status has been reached to the remote unit 100, whereby the remote unit 100 provides the indication to the user. Those skilled in the art will understand how to provide the remote unit 100 with any desired functionality of the control unit 200.

As may be recognized by those of ordinary skill in the pertinent art based on the teachings herein, numerous changes and modifications may be made to the above-described and other embodiments of the present disclosure without departing from the spirit of the invention as defined in the claims. For example, though the embodiments described above relate to the cooking of food, the invention may be utilized to monitor the temperatures of other items and materials. Accordingly, this detailed description of embodiments is to be taken in an illustrative, as opposed to a limiting sense.

What is claimed is:

1. A system for monitoring a status of a food item, the system comprising:
   a first unit having a housing, and a processing unit and a wireless transmitter both positioned within the housing, the processing unit being in operable communication with the wireless transmitter and further in operable communication with a temperature sensing device;
   the temperature sensing device being external to the housing and placeable at a plurality of locations relative to the food item and further being configured to transmit a current temperature of the food item to the processing unit;
   the processing unit being configured to receive the current temperature of the food item and to wirelessly transmit at least said current temperature of the food item via the wireless transmitter; and
   a downloadable computer application, which is adapted for installation on at least one second unit, said computer application adapted to receive the current temperature of the food item wirelessly transmitted by the first unit, and further adapted to:
   (i) display a user interface having a menu bar and a detailed information section, the menu bar comprising tabbed categories including a stats category and a recipe category;
   (ii) in response to selection of the recipe category, display a plurality of recipes including at least a user-selectable cooking item profile in the detailed information section; and
   (iii) in response to selection of the stats category, display at least the current temperature of the food item and a suggested correct cooking temperature associated with the selected cooking item profile in the user interface in the detailed information section.

2. The system of claim 1, wherein the computer application is further adapted to alert a user when the received current temperature has reached the suggested correct cooking temperature.

3. The system of claim 2, wherein the alert is visual or audible.

4. The system of claim 1, wherein the computer application is further adapted to calculate an estimated finish time at which the current temperature will reach the suggested correct cooking temperature, and to display said estimated finish time in the detailed information section.

5. The system of claim 1, wherein the computer application is further adapted to access a memory, to store the current temperature in the memory, and to present a visual graph of the current temperature over time in the detailed information section.

6. The system of claim 1, wherein the processing unit is connectable to the temperature sensing device by a wireless connection.

7. The system of claim 1, wherein the processing unit is connectable to the temperature sensing device by a wired connection.

8. The system of claim 1, wherein the plurality of displayed recipes are downloaded by the computer application via the Internet.

9. The system of claim 8, wherein the plurality of recipes represent a plurality of different types of meat, and wherein the associated suggested correct cooking temperature is the temperature recommended by the FDA.

10. The system of claim 1, wherein the second unit comprises a portable computerized device, comprising a smartphone, computer, or other handheld computing device.

11. A method for monitoring a status of a food item, the method comprising the steps of:
connecting a temperature sensing device to a first unit having a housing, a processing unit and a wireless transmitter both positioning within the housing, the processing unit being in operable communication with the wireless transmitter and further in operable communication with the temperature sensing device;
placing the temperature sensing device at one of a plurality of locations relative to the food item;
transmitting a current temperature of the food item from the temperature sensing device to the processing unit; and
downloading a computer application to a second device, the computer application being adapted to receive the current temperature of the food item wirelessly transmitted by the first unit, and further adapted to:
(i) display a user interface having a menu bar and a detailed information section, the menu bar comprising tabbed categories including a stats category and a recipe category;
(ii) in response to selection of the recipe category, display a plurality of recipes including at least a user-selectable cooking item profile in the detailed information section; and
(iii) in response to selection of the stats category, display at least the current temperature of the food item and a suggested correct cooking temperature associated with the selected cooking item profile in the user interface in the detailed information section.

12. The method of claim 11, further comprising the step of alerting a user when the received current temperature has reached the suggested correct cooking temperature.

13. The method of claim 12, wherein the alert is visual or audible.

14. The method of claim 11, further comprising the step of calculating an estimated finish time at which the current temperature will reach the suggested correct cooking temperature, and displaying the estimated finish time in the detailed information section.

15. The method of claim 11, further comprising the step of using the computer application to access a memory, to store the current temperature in the memory, and to present a visual graph of the current temperature over time in the detailed information section.

16. The method of claim 11, wherein the processing unit is connectable to the temperature sensing device by a wireless connection.

17. The method of claim 11, wherein the processing unit is connectable to the temperature sensing device by a wired connection.

18. The method of claim 11, further comprising the step of downloading the plurality of displayed recipes via the Internet.

19. The method of claim 11, wherein the plurality of recipes represent a plurality of different types of meat, and wherein the associated suggested correct cooking temperature is the temperature recommended by the FDA.

20. The method of claim 11, wherein the second unit comprises a portable computerized device, comprising a smartphone, computer, or other handheld computing device.

21. A system for monitoring a status of a food item, the system comprising:
a temperature sensing device having a piercing portion insertable into the food item, the temperature sensing device configured to transmit a current temperature of the food item;
a first unit having a housing separable from the temperature sensing device, the housing carrying one or more processors and a wireless transmitter, the first unit configured to receive the current temperature of the food item from the temperature sensing device, the wireless transmitter configured to transmit the current temperature of the food item; and
a computer application to be downloaded to and installed on a second unit located remotely from the first unit, the computer application configured to:
receive the current temperature of the food item from the wireless transmitter of the first unit;
display a user interface having a menu bar and a detailed information section, the menu bar having selectable categories including a stats category and a recipe category;
in response to selection of the recipe category, display a plurality of recipes in the detailed information section, the displayed recipes including a user-selectable cooking item profile; and
in response to selection of the stats category, display the current temperature of the food item and a suggested correct cooking temperature associated with the user-selectable cooking item profile in the detailed information section.

22. The system of claim 21, wherein the computer application is further configured to alert a user of the second unit when the current temperature of the food item has reached the suggested correct cooking temperature.

23. The system of claim 22, wherein the alert is visual or audible.

24. The system of claim 21, wherein the computer application is further configured to calculate an estimated finish time at which the current temperature of the food item will reach the suggested correct cooking temperature, and to display the estimated finish time in the detailed information section.

25. The system of claim 21, wherein the computer application is further configured to access a memory, to store the current temperature of the food item in the memory, and to present a visual graph of the current temperature of the food item over time in the detailed information section.

26. The system of claim 21, wherein the first unit is operatively couplable to the temperature sensing device via a wireless connection.

27. The system of claim 21, wherein the first unit is operatively couplable to the temperature sensing device via a wired connection.

28. The system of claim 21, wherein the displayed recipes are downloaded by the computer application via the Internet.

29. The system of claim 28, wherein the displayed recipes represent different types of meat, and wherein the associated suggested correct cooking temperature is the temperature recommended by the FDA.

30. The system of claim 21, wherein the second unit is a smartphone or other handheld computing device.

\* \* \* \* \*